United States Patent
Nakamura

(10) Patent No.: US 10,377,450 B2
(45) Date of Patent: Aug. 13, 2019

(54) METHOD OF CONSTRUCTING AN OFFSHORE STRUCTURE, AND OFFSHORE STRUCTURE

(71) Applicant: MODEC, INC., Tokyo (JP)

(72) Inventor: Takuju Nakamura, Tokyo (JP)

(73) Assignee: MODEC, INC., Tokyo (JP)

( * ) Notice: Subject to any disclaimer, the term of this patent is extended or adjusted under 35 U.S.C. 154(b) by 0 days.

(21) Appl. No.: 15/326,245

(22) PCT Filed: Sep. 25, 2014

(86) PCT No.: PCT/JP2014/075360
§ 371 (c)(1),
(2) Date: Jan. 13, 2017

(87) PCT Pub. No.: WO2016/009572
PCT Pub. Date: Jan. 21, 2016

(65) Prior Publication Data
US 2017/0197690 A1    Jul. 13, 2017

(30) Foreign Application Priority Data
Jul. 17, 2014   (JP) .................................. 2014-146734

(51) Int. Cl.
*B63B 35/44*    (2006.01)
*B63B 35/00*    (2006.01)
(Continued)

(52) U.S. Cl.
CPC .............. *B63B 35/44* (2013.01); *B63B 9/065* (2013.01); *B63B 21/20* (2013.01); *B63B 21/502* (2013.01);
(Continued)

(58) Field of Classification Search
CPC ....... B63B 35/44; B63B 27/36; B63B 21/502; B63B 21/20; B63B 22/20; B63B 27/08;
(Continued)

(56) References Cited

U.S. PATENT DOCUMENTS 5,476,059 A    12/1995   Pollack
6,663,320 B1    12/2003   Braud et al.
(Continued)

FOREIGN PATENT DOCUMENTS

CN    201145003 Y    11/2008
EP    0 945 338 A1    9/1999
(Continued)

OTHER PUBLICATIONS

International Search Report dated Dec. 22, 2014, issued in counterpart International Application No. PCT/JP2014/075360 (2 pages).
(Continued)

*Primary Examiner* — Anthony D Wiest
(74) *Attorney, Agent, or Firm* — Westerman, Hattori, Daniels & Adrian, LLP

(57) ABSTRACT

An offshore structure is separated into an upper structure and a lower structure. Part or whole of the lower structure is kept in an upright standing state in water. The upper structure is moved to above the lower structure kept in the upright standing state. A uniting step includes one or both of raising the lower structure to arrange the lower structure on a lower side of the upper structure and lowering the upper structure to arrange the upper structure on an upper side of the lower structure by submerging part of a carrier vessel on which the upper structure is mounted while being held by a pair of arm-shaped structures of the carrier vessel and integrating the lower structure with the upper structure. In this way, an offshore structure is moored safely at an offshore installation site without using a crane vessel.

8 Claims, 17 Drawing Sheets

(51) Int. Cl.
    *B63B 22/20*     (2006.01)
    *B63B 27/08*     (2006.01)
    *B63B 27/36*     (2006.01)
    *B63B 9/06*     (2006.01)
    *F03D 13/25*     (2016.01)
    *B63B 21/20*     (2006.01)
    *B63B 21/50*     (2006.01)

(52) U.S. Cl.
CPC .............. *B63B 22/20* (2013.01); *B63B 27/08* (2013.01); *B63B 27/36* (2013.01); *B63B 35/00* (2013.01); *B63B 35/003* (2013.01); *F03D 13/25* (2016.05); *B63B 2009/067* (2013.01); *B63B 2021/203* (2013.01); *B63B 2021/505* (2013.01); *B63B 2035/446* (2013.01); *B63B 2207/02* (2013.01); *Y02E 10/727* (2013.01); *Y02P 70/523* (2015.11)

(58) Field of Classification Search
CPC .......... B63B 2021/203; B63B 2207/02; B63B 2035/446
See application file for complete search history.

(56) References Cited

U.S. PATENT DOCUMENTS

| | | | |
|---|---|---|---|
| 7,395,771 | B2 | 7/2008 | Maloberti |
| 2003/0031517 | A1 | 2/2003 | Wetch |
| 2004/0159276 | A1 | 8/2004 | Persson |
| 2007/0220858 | A1 | 9/2007 | Maloberti |
| 2010/0316450 | A1 | 12/2010 | Botwright |
| 2011/0162571 | A1* | 7/2011 | Hooper ................. B63B 21/508 114/230.12 |
| 2012/0183359 | A1 | 7/2012 | Nordstrom et al. |
| 2012/0255478 | A1 | 10/2012 | Hadeler et al. |
| 2013/0152840 | A1 | 6/2013 | Awashima et al. |

FOREIGN PATENT DOCUMENTS

| | | |
|---|---|---|
| FR | 2 876 123 A1 | 4/2006 |
| JP | 10-236385 A | 9/1998 |
| JP | 2012-25272 A | 2/2012 |
| JP | 2012-45981 A | 3/2012 |
| JP | 2012-76738 A | 4/2012 |
| JP | 2012-201219 A | 10/2012 |
| WO | 01/34977 A1 | 5/2001 |
| WO | 2012/097283 A2 | 7/2012 |
| WO | 2013/065826 A1 | 5/2013 |

OTHER PUBLICATIONS

Office Action dated Jan. 17, 2018, issued in counterpart Chinese Application No. 2014800805795 (1 page).

Search Report dated Mar. 1, 2018, issued in counterpart European Application No. 14 89 7522 (2 pages).

\* cited by examiner

METHOD OF CONSTRUCTING AN OFFSHORE STRUCTURE, AND OFFSHORE STRUCTURE

TECHNICAL FIELD

The present invention relates to a method of constructing a floating structure of a spar-type or the like on which a wind turbine or the like is mounted, and to an offshore structure section.

BACKGROUND ART

When a wind turbine is mounted on a floating structure in a sea area having a deep water depth, a semi-submersible type, a tension leg platform (TLP), or the like may possibly be employed. In such cases, the wind turbine or the like and the floating structure are integrally assembled and subjected to test operation onshore, and then towed to an installation site and moored by a mooring system.

On the other hand, in the case of the spar-type, the spar is a floating structure floating in an upright standing state like a fishing float, and a large part of the float is submerged under the sea level by injection of ballast water, or the like. The spar is relatively unlikely to swing, and can support a heavy upper structure. In the case of a spar-type floating structure equipped with a wind turbine, the draft of the float may be as deep as approximately 40 m to 80 m, and the float portion becomes a large structure of approximately 1000 t (ton) or more.

As the spar-type offshore structure, a float-type fluid-force utilizing system is provided as described in International Publication No. 2013/065826, for example. In this system, a horizontal-axis wind wheel or a vertical-axis wind wheel for utilizing wind force is disposed at an on-water portion thereof, and a horizontal axis water wheel or a vertical axis water wheel for utilizing tidal current force is disposed under the water level, and the system utilizes the horizontal axis water wheel or the vertical axis water wheel as ballast.

When the spar-type floating wind turbine is installed at an offshore installation site, as described in Japanese patent application Kokai publication No. 2012-201219, for example, there is provided a method of constructing a floating wind turbine, including: a carrying step of floating a float, which is a lower structure, in a laid-down state on the sea and towing the float with a towing vessel, or mounting the float on a barge, and carrying the float to an offshore installation site; a float upright providing step of floating the float and then bringing the float into an upright standing state by ballast adjustment, and performing draft adjustment; a float mooring step of installing a deck on the float, and connecting one end of a mooring line to the float and connecting the other end thereof to an anchor provided on the bottom of the sea to stabilize the float; and a tower installing step of hanging down a tower, which has been carried to the offshore installation site separately with a barge or the like, by using a crane vessel, and installing the tower on an upper portion of the float.

In this construction method, in order to perform easy and safe construction on the sea and to secure the stability in strong winds or waves, when the tower, which is to be provided upright on the float, is installed on the upper portion of the float, the swing of the tower is controlled by a mass damper provided to the tower or a hanging jig of a crane for hanging down the tower, and the swing of the float is controlled by a control moment gyro provided inside the float.

When the float is moored, and the tower is hang down to be integrated with the moored float by a crane vessel, the crane vessel, which is expensive for use, is necessary. Moreover, since the tower hung down by the crane is likely to be affected by winds, which requires control of the swings of the tower and the float. Accordingly, there is a problem in that the tower installation construction work is difficult to proceed.

Meanwhile, as described in Japanese patent application Kokai publication No. Hei 10-236385, in order to safely and efficiently load and unload a large-sized cargo such as a container crane by utilizing hull buoyancy caused by loading and discharging ballast water, there is proposed a method of loading and unloading a large cargo, in which ballast water is loaded in or discharged from a carrier vessel including a ballast tank and a pair of arm-shaped structures protruding from an end portion of the hull in a stern direction, and a large cargo is loaded and unloaded by utilizing the hull buoyancy caused by loading and discharging the ballast water (see for example Patent Document 3).

PRIOR ART DOCUMENTS

Patent Documents

Patent Document 1: International Publication No. 2013/065826
Patent Document 2: Japanese patent application Kokai publication No. 2012-201219
Patent Document 3: Japanese patent application Kokai publication No. Hei 10-236385

SUMMARY OF THE INVENTION

Problems to be Solved by the Invention

The present invention has been made in view of the above-described circumstances, and an object of the present invention is to provide a method of constructing an offshore structure and an offshore structure which can moor an offshore structure safely at an offshore installation site without using a crane vessel in a method of constructing a floating structure such a spar type with a wind turbine or the like mounted thereon.

Means for Solving the Problems

A method of constructing an offshore structure of the present invention for achieving the above-described object is a method for constructing an offshore structure, characterized in that the method includes: a manufacturing step of manufacturing an offshore structure separated in an upper structure and a lower structure; an in-water keeping step of keeping part or whole of the lower structure in an upright standing state in water; a moving step of moving the upper structure to above the lower structure kept in the upright standing state; an uniting step including one or both of an raising step of raising the lower structure to arrange the lower structure on a lower side of the upper structure and a lowering step of lowering the upper structure to arrange the upper structure on an upper side of the lower structure by submerging part of a carrier vessel on which the upper structure is mounted while being held by a pair of arm-shaped structures of the carrier vessel; and a joining step of integrating the lower structure with the upper structure.

In shorts, according to the construction method of the present invention, in the raising step of the uniting step of the present invention, the lower structure, the part or whole of which is in the water, is raised by a hanging line or the like relative to the upper structure, thereby joining the upper structure and the lower structure, on the contrary to the conventional techniques in which when an upper structure and a lower structure are integrated on the sea, relative to the lower structure disposed on the sea, the upper structure hung by a crane or the like is lowered onto the lower structure from above the lower structure, thereby joining the upper structure and the lower structure. Note that the raising of the lower structure can be easily performed by pulling up the hanging line, or discharging ballast water in the lower structure, or removing ballast, or the like.

In addition, in the lowering step of the uniting step of the present invention, the upper structure and the lower structure are united by lowering the upper structure by submerging part of the carrier vessel on which the upper structure is mounted while being held by the pair of arm-shaped structure, unlike the conventional techniques in which an upper structure hung by a crane or the like is lowered down onto a lower structure.

According to this method, in the raising step of the uniting step, the lower structure, the part or whole of which is under the water and which thus requires a relatively small force for vertical movement, is raised in a state where the upper structure is placed on the carrier vessel or is fixed on the sea by the carrier vessel or a towing vessel or the like. This eliminates the necessity of vertically moving the upper structure, most or whole of which is above the water level and which thus requires a large force for vertical movement, and the floating structure can therefore be moored safely at the offshore installation site without using a crane vessel. In addition, the upper structure is mounted and fixed on the carrier vessel, and the lower structure is abutted and fixed on the upper structure; accordingly, joining work and the like on the sea can be performed in an environment where the entire inertia is large and pitching and rolling is minimized, and that manpower and motive power required for the joining work and the like can be safely supplied from the carrier vessel.

Moreover, in the lowering step of the uniting step, the upper structure is lowered by submerging part of the carrier vessel with the upper structure being placed on the carrier vessel in a state where the lower structure is fixed or moored. Accordingly, the upper structure and the lower structure can be united safely at the offshore installation site without using a crane vessel.

When the above-described method of constructing an offshore structure is configured such that in the raising step, the lower structure is raised by using a winch mounted on a carrier vessel for moving at least one of the upper structure and the lower structure, since the lower structure is raised without using a floating crane vessel, the construction cost can be saved.

Moreover, when the above-described method of constructing an offshore structure is configured such that the joining step is a step of integrating the lower structure with the upper structure in a state where the upper structure is held by the pair of arm-shaped structures of the carrier vessel, the method includes: between the manufacturing step and the in-water keeping step, a mounting step of mounting the upper structure in an upright standing state on a carrier vessel including a ballast tank and a pair of arm-shaped structures protruding from an end portion, which is a bow or a stern, of a hull of the carrier vessel in a bow-stern direction; a carrying step of carrying the upper structure and the lower structure one by one or simultaneously to an offshore installation site by means of the carrier vessel; and a launching step of hanging the lower structure down from the carrier vessel by means of a hanging line and lowering the lower structure into the water, and the method also includes: after the joining step, a floating step of unloading the integrated upper structure and lower structure from the carrier vessel and floating the integrated upper structure and lower structure on the sea, the following effects can be achieved.

Specifically, in the mounting step, the upper structure is mounted in the upright standing state on the carrier vessel including the ballast tank and the pair of arm-shaped structures protruding from the end portion, which is the bow or the stern, of the hull of the carrier vessel in the bow-stern direction. Accordingly, a crane vessel or a large-sized crane for mounting the upper structure onto the carrier vessel becomes unnecessary.

Moreover, since the upper structure is carried in the upright standing state, the work of bringing the upper structure into the upright standing state on the sea is eliminated, and a crane vessel or a large-sized crane on the carrier vessel becomes unnecessary. On the other hand, the lower structure can be carried in the upright standing state as in the case of the upper structure, which eliminates the work for bringing the lower structure from a laid-down state into a vertical state on the sea, thus simplifying the work, as compared to the case of carrying the lower structure in the laid-down state.

Furthermore, in the floating step as well, when the integrated upper structure and lower structure are unloaded from the carrier vessel and floated on the sea, the offshore structure can be unloaded from the carrier vessel by floating the offshore structure by the ballast water operation on the carrier vessel side and pulling the carrier vessel away. Accordingly, a crane vessel or a large-sized crane becomes unnecessary in the floating step as well.

Note that, since the whole or most of the lower structure is submerged in the water during the installation, even when the lower structure is mounted in the laid-down state onto the carrier vessel or is towed in the laid-down state by a towing vessel, the lower structure can be brought into the vertical state by loading the ballast water or another ballast or the like at the installation site, relatively easily by using only a relatively small crane, a winch, or the like. On the other hand, the upper structure is equipped with instruments, such as a wind power generation facility, which need to be prevented from being submerged in the water. For this reason, when the upper structure is carried in the laid-down state as in the conventional techniques, it is necessary to bring the upper structure from the laid-down state into the vertical state on the sea at the installation site or on the carrier vessel, which requires a crane vessel or a large-sized crane on the carrier vessel.

Against this, in the present invention, the upper structure can be carried after the assembly of the upper structure is completed onshore and test operation and the like is finished. In addition, the upper structure is mounted and fixed on the carrier vessel, and the lower structure is abutted and fixed on the upper structure; accordingly, joining work on the sea can be performed in an environment where the entire inertia is large and pitching and rolling is minimized, and that manpower and motive power required for the joining work and the like can be safely supplied from the carrier vessel.

In addition, when the above-described method of constructing a floating structure is configured such that in the floating step, when the integrated upper structure and lower structure are unloaded from the carrier vessel, part of the carrier vessel is submerged, the integrated upper structure and lower structure can be easily floated on the sea with their attitude maintained in the vertical state.

In addition, when the above-described method of constructing an offshore structure is configured such that in the launching step, the lower structure is settled on the water bottom, a construction method suitable not for the float type offshore structure but for a grounding-type offshore structure, which does not require mooring using mooring lines can be achieved. Meanwhile, also in the case of the float-type requiring mooring using mooring lines, under severe weather or oceanographic conditions or tidal currents, the offshore structure can be positioned and held safely at the installation site by temporarily settling and placing the lower structure on the sea bed. Note that a tension leg platform (TLP) using tendons as the mooring lines instead anchor chains, ropes, and the like may be used.

Then, when the above-described method of constructing an offshore structure is configured such that the method further includes: after the carrying step and before the joining step, a mooring-line connecting step of connecting the upper structure or the lower structure to a mooring base with a mooring line, the following effect can be achieved. When the connection portion of the mooring line on the floating structure side is situated on the lower structure side, since the connecting work for the mooring line is performed before the joining step, the lower structure is connected to the mooring line in a stable state during the joining step. Accordingly, the joining work be easily performed. Alternatively, when a mooring-line connecting step of connecting the upper structure to a mooring base with a mooring line is provided after the carrying step and before the joining step, the joining work can be performed at the stage where the upper structure is mounted and stable on the carrier vessel and the load by the lower structure is not applied to the arm-shaped structures of the carrier vessel.

Alternatively, in the above-described method of constructing a floating structure, when a mooring-line connecting step of connecting the integrated upper structure and lower structure to a mooring base with a mooring line is provided after the joining step, in a case where the connection portion of the mooring line on the floating structure side is situated on the lower structure side, the connecting work between the lower structure and the mooring line can be performed not in the water but above the water level, and also in a safe environment where the upper and lower structures are mounted and fixed on the carrier vessel, and the joining work can thus be efficiently performed. Note that when the carrier vessel or the arm-shaped structures thereof are obstacle to connecting the mooring line, the connecting work for the mooring line may be performed after the floating step.

Then, a floating structure of the present invention for achieving the above-described object is configured such that the floating structure includes: an upper structure and a lower structure joined to each other, and is configured to be disposed on a sea, and for the upper structure to be capable of being mounted in an upright standing state on a carrier vessel including a ballast tank and a pair of arm-shaped structures protruding from an end portion, which is a bow or a stern, of a hull of the carrier vessel in a bow-stern direction, the upper structure includes an engagement portion configured such that while the upper structure is in the upright standing state, the engagement portion can receive the pair of arm-shaped structures sliding thereinto from a lateral side and be placed onto the pair of arm-shaped structures.

According to this configuration, since the upper structure can be mounted in the upright standing state on the carrier vessel including the ballast tank and the pair of arm-shaped structures protruding from the end portion, which is the bow or the stern, of the hull of the carrier vessel in a bow-stern direction, the above-described method of constructing a floating structure can be implemented and the same operations and effects as those of the above-described method of constructing a floating structure can be obtained.

In addition, when the above-described floating structure is configured such that the floating structure has a structure with a center of buoyancy located above a center of gravity, the upper structure is mainly constituted of an on-water portion, the lower structure is mainly constituted of a submerging portion, the upper structure and the lower structure are connected to each other in such a manner as to be capable of being coupled and separated, the upper structure and the lower structure of the spar-type offshore structure are configured to be capable of being coupled, the installation of the offshore structure is facilitated. In addition, since the upper structure and the lower structure are configured to be capable of being separated, the offshore structure can be easily disassembled, which facilitates the removal work of the floating structure. Therefore, even after the offshore structure is installed, the offshore structure can be easily moved or dismantled. In addition, in a case where the mooring line is connected to the lower structure, when serious failure occurs in the upper structure and a similar event occurs, it is possible to easily remove and bring back only the upper structure and then to easily reinstall the upper structure after restoration.

When the above-described offshore structure is configured such that when the upper structure and the lower structure are integrated and mounted upright on a carrier vessel, a lowermost portion of the floating structure protrudes below a lowermost portion of the carrier vessel by three meters or more, since it is difficult to mount the upper structure and the lower structure which are integrated and in the upright standing state on a carrier vessel at a port with a normal water depth, the construction method of the present invention is particularly effective. Accordingly, such a vertically long floating structure can also be easily installed at the offshore installation site by using the construction method of the present invention. Note that the upper limit of the amount of protrusion of the lowermost portion of the floating structure below the lowermost portion of the carrier vessel is approximately 100 m in a realistic design at the current stage, but is sufficiently possible to be approximately 400 m, and may be on the order of 1000 m in the future.

When the above-described offshore structure is configured such that the lower structure is formed to have a ballast-water loading and discharging facility for not only loading but also discharging ballast water or to have a ballast loading and discharging facility for not only loading but also discharging solid ballast, or to have a structure with which the ballast-water loading and discharging facility or the ballast loading and discharging facility is capable of being temporarily attached thereto, it is possible to easily float the lower structure by using the ballast-water loading and discharging facility or the ballast loading and discharging facility. Accordingly, the removal work of the offshore structure is facilitated, and the floating structure can thus be easily moved and dismantled.

When the above-described offshore structure is configured such that the engagement portion is formed of a protruding part protruding from the upper structure horizontally in three directions or more, and the protruding part is provided with a connection portion for connecting a mooring line, it possible to perform, at the protruding part, the mounting work for the upper structure onto the carrier vessel, as well as the connecting work, the adjusting work, and the inspection work for the mooring line at the connection portion. In particular, when the protruding part is configured to be above water during the mooring work, diving work becomes unnecessary, so that the connecting work of these mooring lines and the like can be easily performed. Meanwhile, when the protruding part is below but near the water level during the mooring work, the connecting work of the mooring lines and the like becomes relatively easy.

When the above-described offshore structure is configured such that the offshore structure is moored by a mooring line, an arm is supported at one end side to the offshore structure in such a manner as to be swingable only about a horizontal axis, and a connection portion for connecting the mooring line is provided on another end side of the arm, the following effect can be achieved.

Specifically, there is a problem in the mooring of the conventional technique for the spar-type offshore structure, in which since a connection member, such as a chain stopper, is provided at a position at a small distance (attachment radius) from a center axis of the offshore structure in the vertical direction, the restoring moment by the mooring force of the mooring line, which acts on a swing (hereinafter referred to as twist) of the offshore structure in the turning direction, that is, on the horizontal plane, and which is in the direction to return the twist. The twist occurs in direct relation to the power generating torque when the floating structure is equipped with, a vertical-axis wind wheel, and occurs in direct relation to the turning or maintaining of a horizontal-axis wind wheel to windward against wind force when the floating structure is equipped with a horizontal-axis wind wheel.

In contrast to the configuration of the conventional techniques, in the above-described configuration, the arm is interposed, so that the connection portion can be provided at a position at a large distance (attachment radius) from the center axis of the offshore structure in the vertical direction by an amount corresponding to the arm. Accordingly, the restoring moment by the mooring force of the mooring line, which acts in the direction to return the twist can be increased. As a result, it is possible to suppress the swing (turning motion) in which the entire floating structure is twisted and returned in the turning direction.

Moreover, when the connection portion is provided at a position with a small attachment radius as in the conventional technique, with the swing (inclination) of the offshore structure about the horizontal axis, the amount of displacement at the position of the connection portion becomes small. Accordingly, the variation in mooring force of the mooring line also becomes small, and the allowable range for the inclination of the offshore structure is wide. On the other hand, when the connection portion is provided at a position with a large attachment radius as in the above-described configuration, there is a problem in that with the inclination of the offshore structure, the amount of displacement at the position of the connection portion becomes large. Accordingly, the variation in mooring force of the mooring line also becomes large, and the allowable range for the inclination of the offshore structure becomes narrow.

Against this, in the above-described configuration, the arm is supported at one end side on the of structure in such a manner as to be swingable only about the horizontal axis. This makes it possible to reduce the restriction by the mooring force of the mooring line and to thus widen the allowable range for the swing of the offshore structure. Note that the arm may be provided on the upper structure side of the offshore structure or may be provided on the lower structure side.

When the above-described offshore structure is configured such that a swinging part swingable about a vertical axis is provided on the other end side of the arm, and the connection portion for connecting the mooring line is provided on the swinging part, as the attachment radius of the connection portion is increased by providing the arm, the variation in the mooring direction of the mooring line at the connection portion due to the twist of the floating structure increases; however, this swinging part swingable about the vertical axis allows for the increase in the variation in the mooring direction of the mooring line, thus making it possible to prevent the connection portion and the mooring line from damaging.

Effect of the Invention

As described above, according to the method of constructing an offshore structure and the offshore structure of the present invention, an offshore structure can be moored safely at an offshore installation site without using a crane vessel in a method of constructing an offshore structure such a spar type with a wind turbine or the like mounted thereon.

MODES FOR CARRYING OUT THE INVENTION

Figure 1:
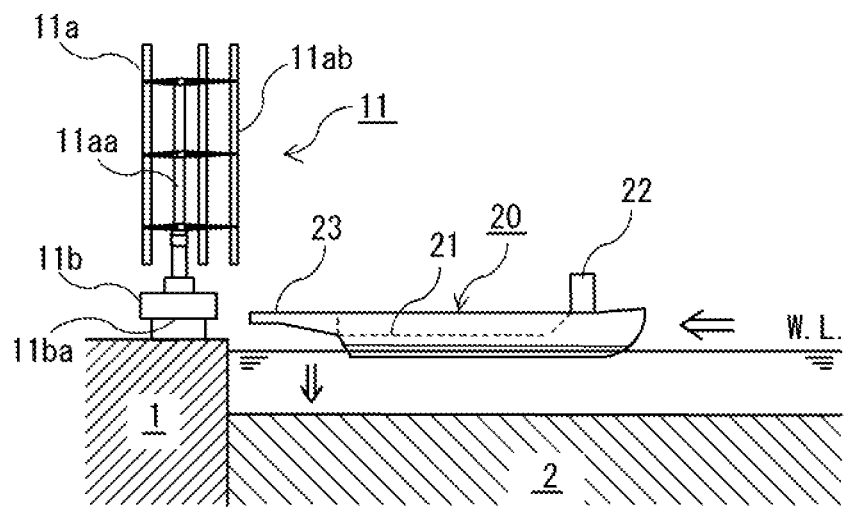
FIG. 1 is a schematic diagram for explaining a method of constructing a floating structure of a first embodiment according to the present invention, and illustrates a state immediately before mounting an upper structure on a carrier vessel in a mounting step.

Hereinafter, a method of constructing an offshore structure and a floating structure of embodiments according to the present invention will be described. In the description of the embodiments, an offshore structure of a float-type hydrodynamic force utilizing system in which a vertical-axis wind wheel utilizing wind power is disposed in an on-water-surface portion and a vertical axis water wheel utilizing tidal current force is disposed under the water to utilize the horizontal axis water wheel or the vertical axis water wheel as ballast will be described as an example of an offshore structure. The present invention is, however, not limited to this offshore structure and may be applied to another offshore structure into which an upper structure and a lower structure are integrated onshore.

As illustrated in FIGS. 1 to 15, an offshore structure 10 of a first embodiment illustrated herein is an offshore structure into which an upper structure 11 and a lower structure 12 are joined and which is disposed onshore. The upper structure 11 includes: a vertical-axis wind wheel 11a having a rotary shaft 11aa and a vertical blades 11ab; and a wind-wheel supporting portion 11b which supports the vertical-axis wind wheel 11a. In addition, the lower structure 12 includes a vertical axis water wheel.

For the upper structure 11 to be capable of being mounted in an upright standing state on a carrier vessel 20, the wind-wheel supporting portion 11b of the upper structure 11 includes an engagement portion 11ba configured such that while the upper structure 11 is in the upright standing state, the engagement portion 11ba can receive a pair of arm-shaped structures 23 provided to the carrier vessel 20 and sliding thereinto from a lateral side, and be placed onto the pair of arm-shaped structures 23. Note that although a lower portion of a ring protruding annularly from a lower portion of the column serves as the engagement portion 11ba in this embodiment, but an upper portion of an insertion hole allowing the arm-shaped structures 23 to be inserted may be used as the engagement portion.

As illustrated in FIGS. 16 to 24, an offshore structure 10A of a second embodiment is different in that a lower structure 12A does not include the vertical axis water wheel and is formed of a weight. The shape of the offshore structure 10A is more likely to be substantially the same as a known shape as the spar-type offshore structure.

In addition, as illustrated in FIGS. 1 to 14 and 16 to the carrier vessel 20 includes: a deck 21 on which the upper structure 11 can be mounted in an upright standing state; a bridge 22 for navigation; and propulsion devices such as a propulsion engine and propellers and a fuel tank, which are not illustrated. Moreover, the carrier vessel 20 includes ballast tanks and configured to be capable of loading and discharging ballast water and controlling movement between the ballast tanks to adjust the draft and trim of the hull (inclination in a bow-stern direction) when a heavy-weight carried object is loaded or unloaded and when a carried object is moved toward the bow.

Furthermore, the carrier vessel 20 includes the pair of arm-shaped structures 23 protruding from an end portion, which is the bow or the stern, of the hull in the bow stern direction (the direction from the stern to the stern in FIGS. 1 to 14 and 16 to 23). The pair of arm shaped structures 23 are arranged in a U-shape open on the stern side in such a manner as to face each other in the lateral direction of the stern, when viewed from above.

Figure 2:
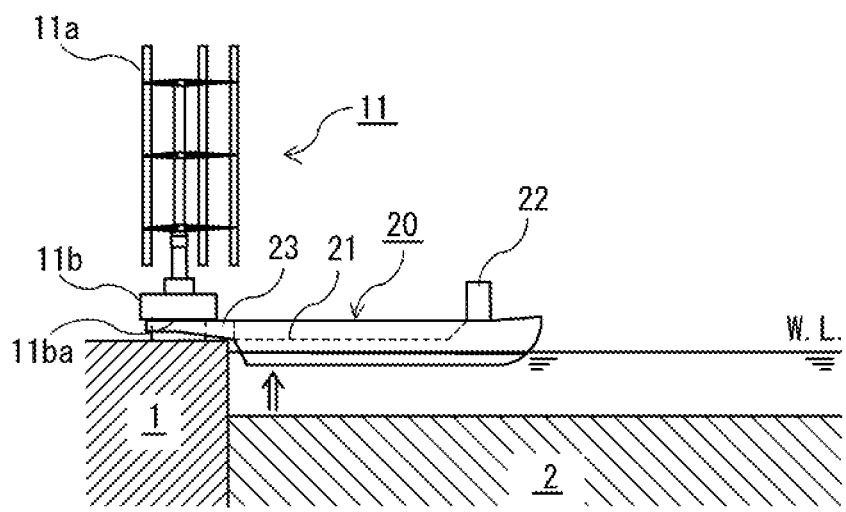
FIG. 2 is a schematic diagram for explaining the method of constructing an offshore structure of the first embodiment according to the present invention, and illustrates a state where the upper structure is mounted on the carrier vessel in the mounting step.

Then, as illustrated in FIGS. 1 to 2, the carrier vessel 20 is moved backward while inserting the pair of arm-shaped structures 23 below the engagement portion 11ba of the upper structure 11 placed on a quay 1 from the opening side of the U-shape, to thereby set the pair of arm-shaped structures 23 below the engagement portion 11ba. Then, the stern side of the carrier vessel 20 or the entire carrier vessel 20 is raised by discharging the ballast water from the unillustrated ballast tanks, so that the pair of arm-shaped structures 23 are abutted against the engagement portion 11ba. Further, the weight of the upper structure 11 is supported by the pair of arm-shaped structures 23 to raise the upper structure 11 above the quay 1, so that the upper structure 11 is mounted on the carrier vessel 20.

Figure 13:
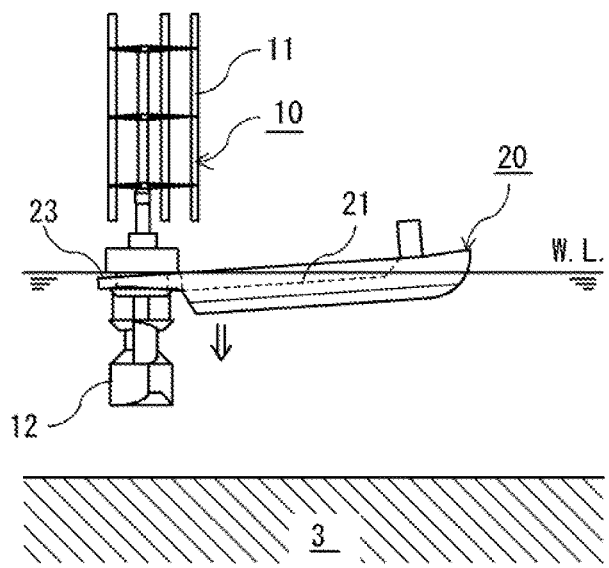
FIG. 13 is a schematic diagram for explaining the method of constructing an offshore structure of the first embodiment according to the present invention, and illustrates a state where an offshore structure is being unloaded from the carrier vessel in a floating step.
Figure 14:
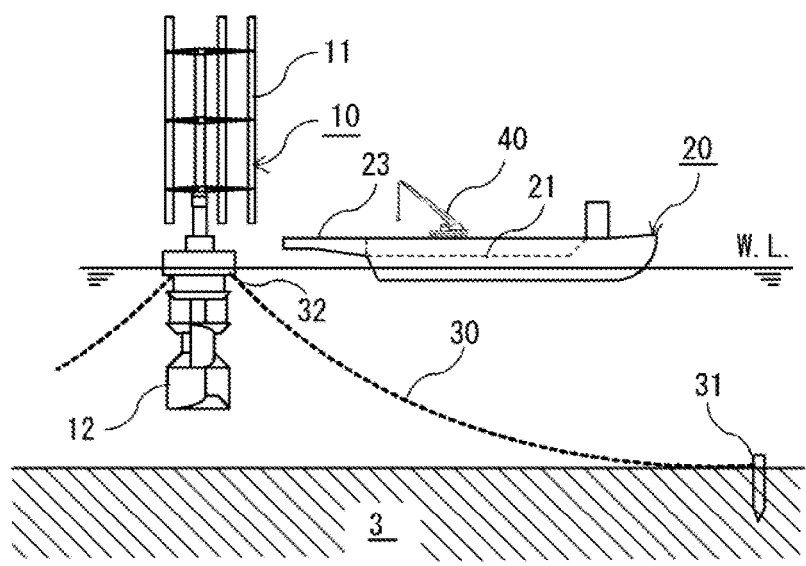
FIG. 14 is a schematic diagram for explaining the method of constructing an offshore structure of the first embodiment according to the present invention, and illustrates a state after a mooring-line connecting step.
Figure 15:
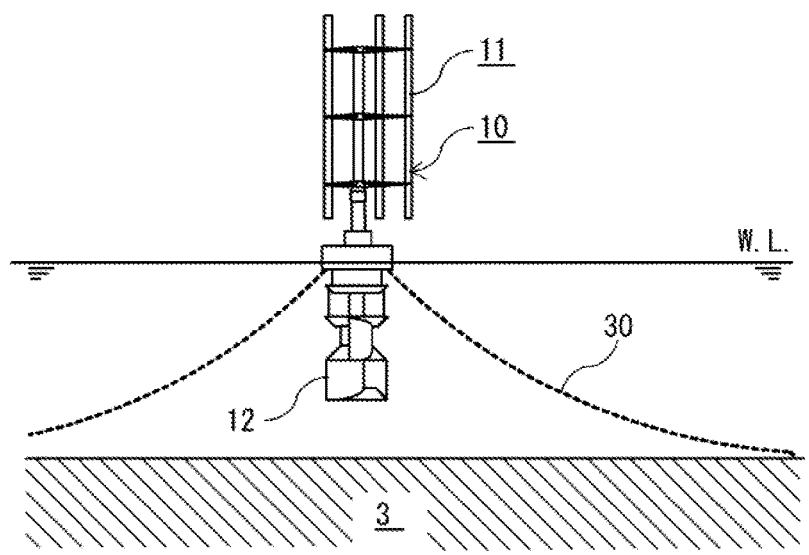
FIG. 15 is a schematic diagram for explaining the method of constructing an offshore structure of the first embodiment according to the present invention, and illustrates a state after construction.
Figure 16:
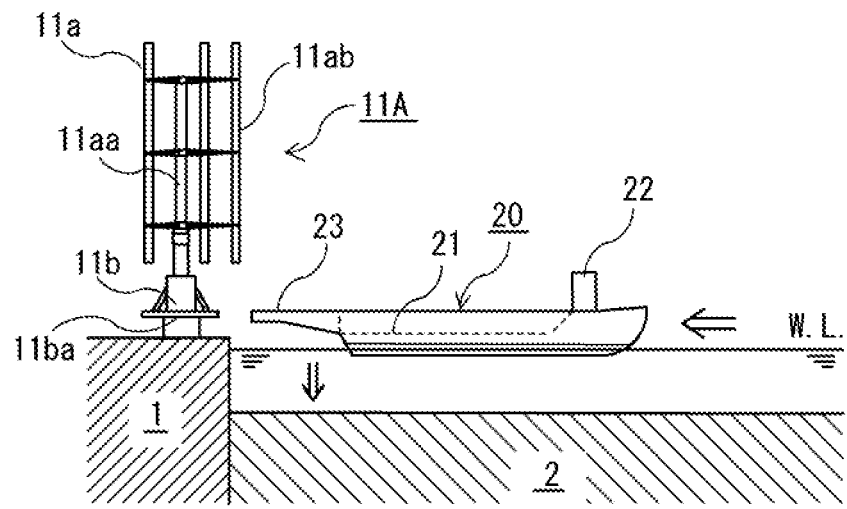
FIG. 16 is a schematic diagram for explaining a method of constructing an offshore structure of a second embodiment according to the present invention, and illustrates a state immediately before mounting an upper structure onto a carrier vessel in a mounting step.

In addition, as illustrated in FIG. 13, when a carried object (the upper structure in FIG. 13) 11 is launched on the sea, the stern side of the hull is submerged to float the carried object. Then, the hull is moved forward to pull the pair of arm-shaped structures 23 from the engagement portion of the carried object, so that the carried object is launched on the sea.

Then, in a case where the offshore structure 10 is configured such that a lowermost portion of the offshore structure 10 protrudes below a lowermost portion of the carrier vessel 20 by three meters or more when the upper structure 11 and the lower structure 12 are integrated and mounted on the carrier vessel, the construction method of the present invention is particularly effective because of limitation on the water depth in a general port facility. Note that the upper limit of the amount of protrusion of the lowermost portion of the offshore structure 10 below the lowermost portion of the carrier vessel 20 is approximately 100 m in a realistic design at the current stage, but is sufficiently possible to be approximately 400 m, and may be on the order of 1000 m in the future.

Next, the method of constructing an offshore structure of the embodiment of the present invention will be described with reference to the drawings. This method of constructing an offshore structure of a first embodiment is a construction method employed when a first offshore structure 10 is installed on the sea at the installation site, and is as illustrated in FIGS. 1 to 15. In addition, the method of constructing an offshore structure of a second embodiment is a construction method employed when an offshore structure 10A of a second embodiment is installed on the sea at the installation site, and is as illustrated in FIGS. 16 to 24.

First, the method of constructing an offshore structure of the first embodiment will be described. This method of constructing an offshore structure includes a manufacturing step; a mounting step; a carrying step; a launching step; an in-water keeping step; a moving step; an uniting step including one or both of a raising step and a lowering step; a joining step; a floating step; and a mooring-line connecting step.

In the manufacturing step, the offshore structure 10 is manufactured while being separated in the upper structure 11 and the lower structure 12. In general, as illustrated in FIG. 1, the upper structure 11 and the lower structure 12 are manufactured at the quay 1 so as to be easily transported by sea because of involving movement to an offshore installation site. However, since the water depth to the bottom of the sea (or the water bottom) at this site is relatively shallow, it is difficult to launch and tow the upper structure 11 and the lower structure 12 in an integral upright standing state from the quay 1.

For this reason, in the mounting step following the manufacturing step, as illustrated in FIG. 1, the upper structure 11 is mounted in an upright standing state onto the carrier vessel 20. In the mounting step, when the upper structure 11 is mounted onto the carrier vessel 20, ballast water is loaded in the carrier vessel 20 to perform ballast adjustment such that the height of the pair of left and right arm-shaped structures 23 at the stern of the carrier vessel 20 is below the engagement portion 11ba of the upper structure 11.

Next, as illustrated in FIG. 2, in a state where the height of the arm-shaped structures 23 is below the engagement portion 11ba, the carrier vessel 20 is moved backward to insert the arm-shaped structures 23 below the engagement portion 11ba. After the insertion is completed, the ballast water is discharged to raise the height of the arm-shaped structures 23, so that the arm-shaped structures 23 are abutted against the lower side of the engagement portion 11ba. The arm-shaped structures 23 are then further raised to hold the upper structure 11, and the upper structure 11 is moved away from the quay. In this way, the upper structure 11 is mounted on the arm-shaped structures 23 of the carrier vessel 20.

In the mounting step, the upper structure 11 is mounted in an upright standing state onto the carrier vessel 20 including the ballast tanks and the pair of arm-shaped structures 23. Accordingly, a crane vessel or a large-sized crane for mounting the upper structure 11 onto the carrier vessel 20 becomes unnecessary.

Figure 3:
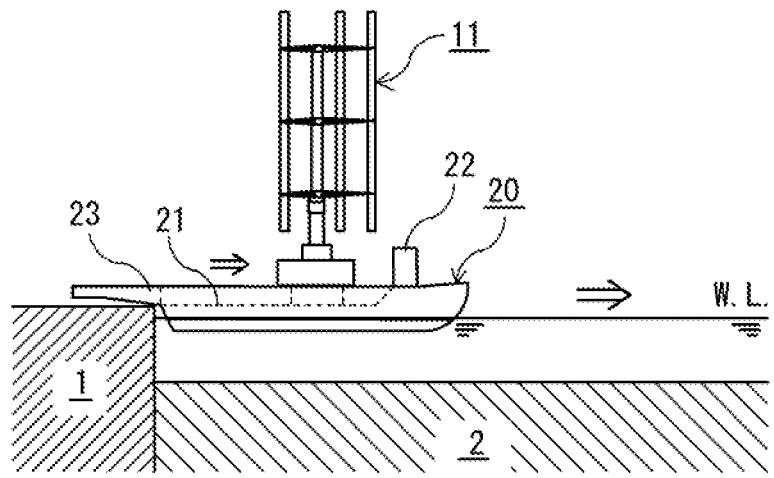
FIG. 3 is a schematic diagram for explaining the method of constructing an offshore structure of the first embodiment according to the present invention, and illustrates a state where the upper structure mounted on the carrier vessel is being moved onto a deck in the mounting
Figure 4:
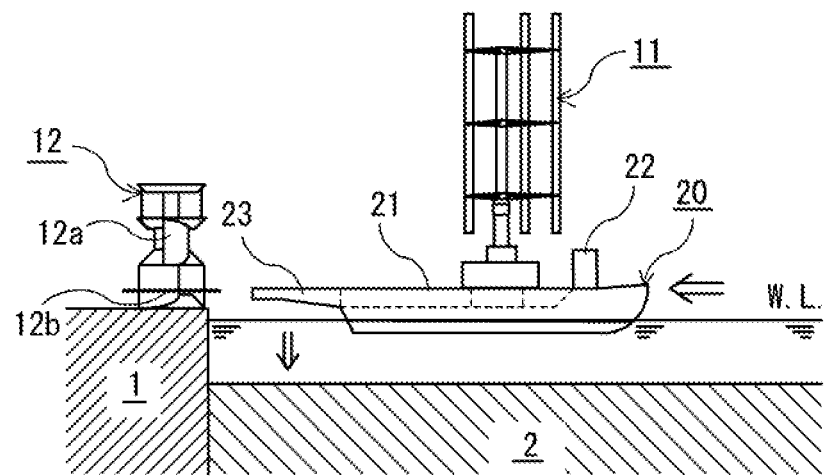
FIG. 4 is a schematic diagram for explaining the method of constructing an offshore structure of the first embodiment according to the present invention, and illustrates a state immediately before mounting a lower structure onto the carrier vessel in the mounting step.
Figure 5:
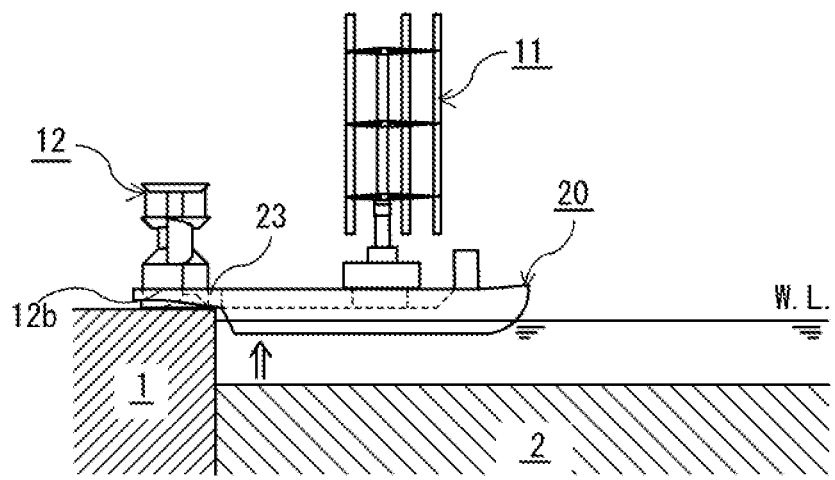
FIG. 5 is a schematic diagram for explaining the method of constructing an offshore structure of the first embodiment according to the present invention, and illustrates a state where the lower structure is mounted on the carrier vessel in the mounting step.
Figure 6:
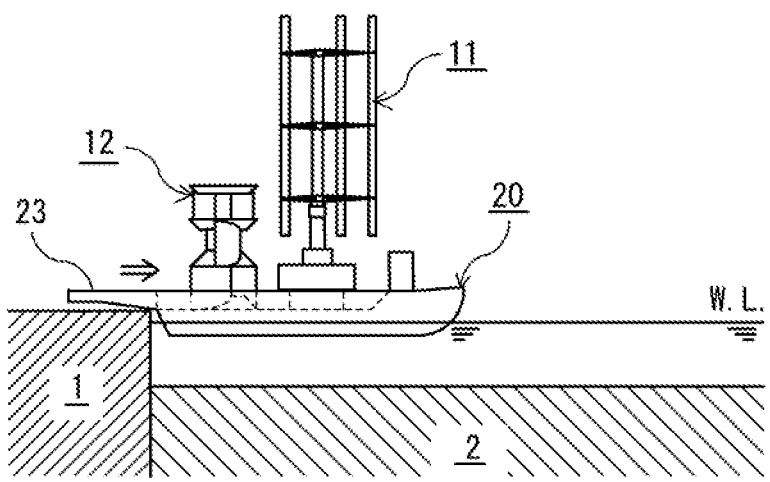
FIG. 6 is a schematic diagram for explaining the method of constructing an offshore structure of the first embodiment according to the present invention, and illustrates a state where the lower structure mounted on the carrier vessel is being moved onto the deck in the mounting step.
Figure 7:
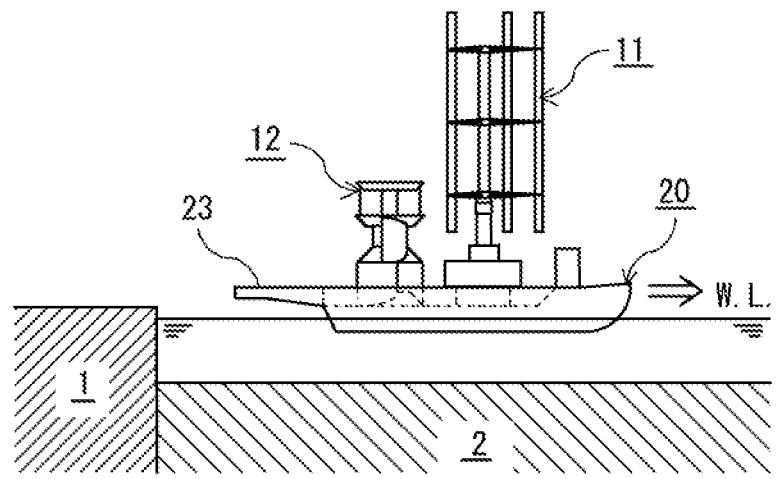
FIG. 7 is a schematic diagram for explaining the method of constructing an offshore structure of the first embodiment according to the present invention, and illustrates a state where the carrier vessel starts operation in a carrying step.

Next, as illustrated in FIG. 3, the upper structure 11 is moved toward the bow of the carrier vessel 20. In this state, the carrier vessel 20 is moved away from the quay 1 where the upper structure 11 has been placed, and is moved to the quay where the lower structure 12 is placed, as illustrated in FIG. 4, and the lower structure 12 is mounted on the carrier vessel 20 in the same manner as the mounting of the upper structure 11, as illustrated in FIGS. 4 to 7.

The upper structure 11 and the lower structure 12 may be mounted respectively onto separate carrier vessels 20, 20 depending on the load capacity of the carrier vessel 20 or as necessary, or the upper structure 11 and the lower structure 12 may be mounted simultaneously onto the same carrier vessel 20.

Figure 8:
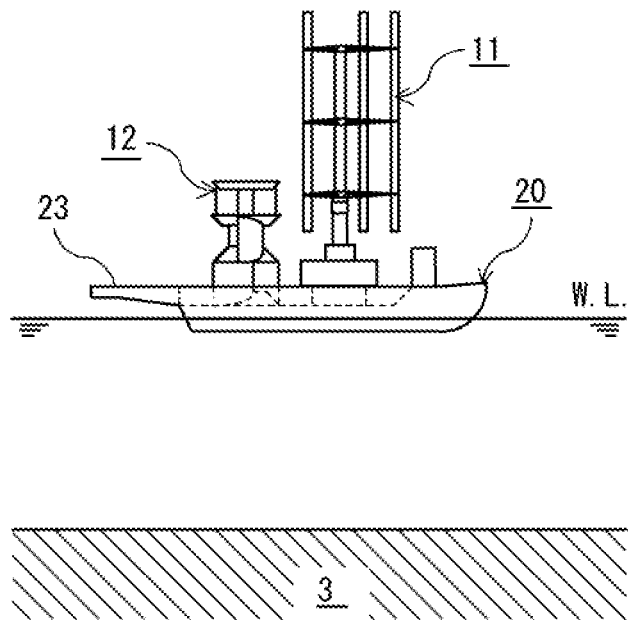
FIG. 8 is a schematic diagram for explaining the method of constructing an offshore structure of the first embodiment according to the present invention, and illustrates a state where the carrier vessel arrives at an offshore installation site in the carrying step.

After the upper structure 11 and the lower structure 12 are mounted in the mounting step, the upper structure 11 and the lower structure 12 are carried to the offshore installation site by the carrier vessel 20 in the next carrying step, as illustrated in FIG. 8. This movement is performed by the self-navigation of the carrier vessel 20.

Figure 9:
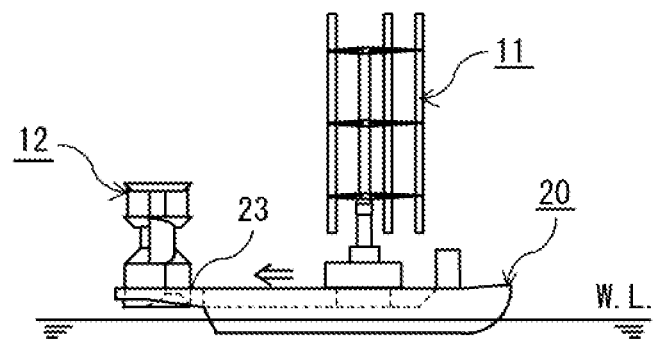
FIG. 9 is a schematic diagram for explaining the method of constructing an offshore structure of the first embodiment according to the present invention, and illustrates a state where the lower structure is moved to a stern on the carrier vessel in a launching step.
Figure 9:
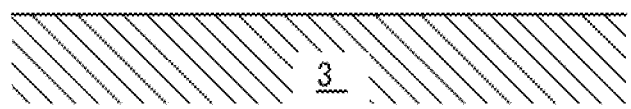
Figure 10:
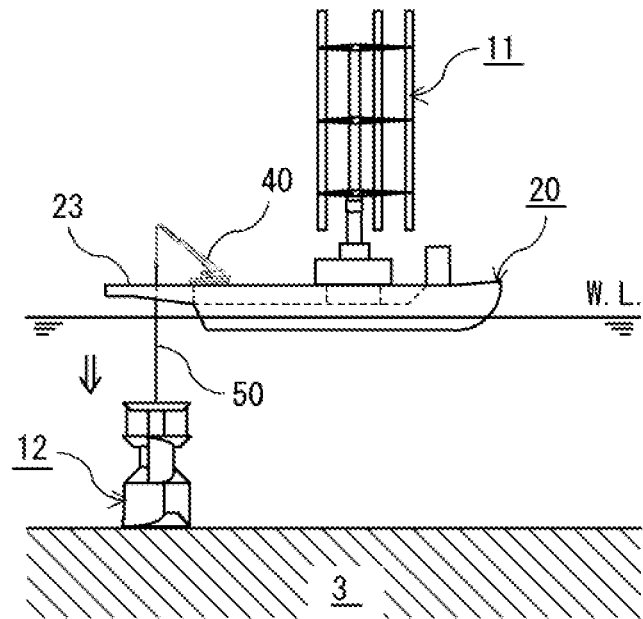
FIG. 10 is a schematic diagram for explaining the method of constructing an offshore structure of the first embodiment according to the present invention, and illustrates a state where the lower structure is launched from the carrier vessel in a launching step.

Once the carrier vessel 20 arrives at the offshore installation site, the lower structure 12 is hung down in the upright standing state from the carrier vessel 20 into the water by means of a hanging line 50, in the launching step, as illustrated in FIGS. 9 and 10. When the water depth of the offshore installation site is relatively shallow, the lower structure 12 is placed on the bottom of the sea (or the water bottom) 3. This hanging of the lower structure 12 is performed by loading the ballast water or loading another ballast to submerge the lower structure 12 while hanging and maintaining the lower structure 12 in a substantially vertical state by means of the hanging line 50.

In this event, the amount of the ballast is made such that the weight in water of the lower structure 12 is balanced with the buoyancy, making it possible to significantly reduce the load applied to the hanging line 50. Accordingly, the crane capacity of the winch, the crane vehicle 40, and the like provided on the carrier vessel 20 becomes sufficient without requiring a large crane. Therefore, it is unnecessary to provide a large-sized crane on the carrier vessel 20, and it is sufficient to use the winch provided on the carrier vessel 20 or to mount the commercially-available crane vehicle 40 (the drawings show the case of using the crane vehicle). Note that when the capacity of the winch is insufficient, the capacity may be modified to a capacity sufficient for construction).

As described above, carrying the lower structure 12 in the upright standing state eliminates the work for bringing the lower structure 12 from a laid-down state into a vertical state on the sea, thus simplifying the work, as compared to the case of carrying the lower structure 12 in the laid-down state.

Figure 11:
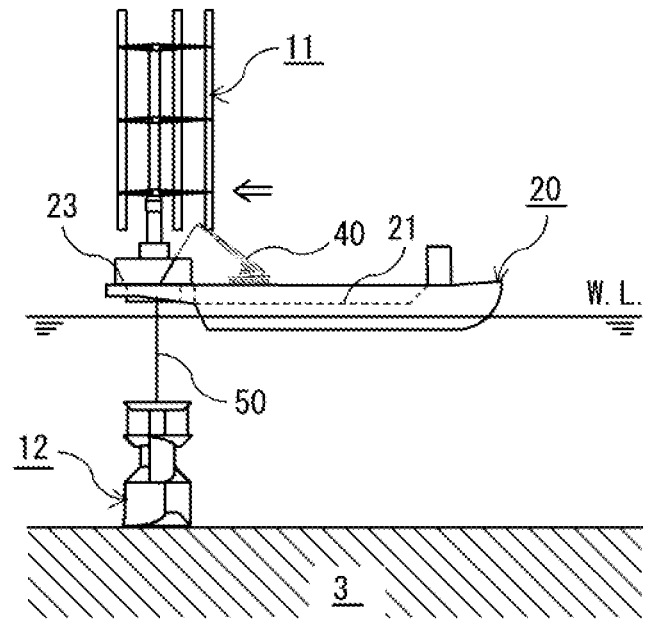
FIG. 11 is a schematic diagram for explaining the method of constructing an offshore structure of the first embodiment according to the present invention, and illustrates a state of the lower structure in an in-water keeping step and a state where the lower structure is being moved to the stern on the carrier vessel in a moving step.

In the next in-water keeping step, part or whole of the lower structure 12 is kept in the upright standing state in water. In the next moving step, the upper structure 11 is moved to above the lower structure 12 kept in the upright standing state, as illustrated in FIG. 11. The movement of the upper structure 11 is performed by moving the upper structure 11 to above the arm-shaped structures 23 on the carrier vessel 20, and then controlling the position of the carrier vessel 20 such that the upper structure 11 is arranged above the lower structure 12.

Figure 12:
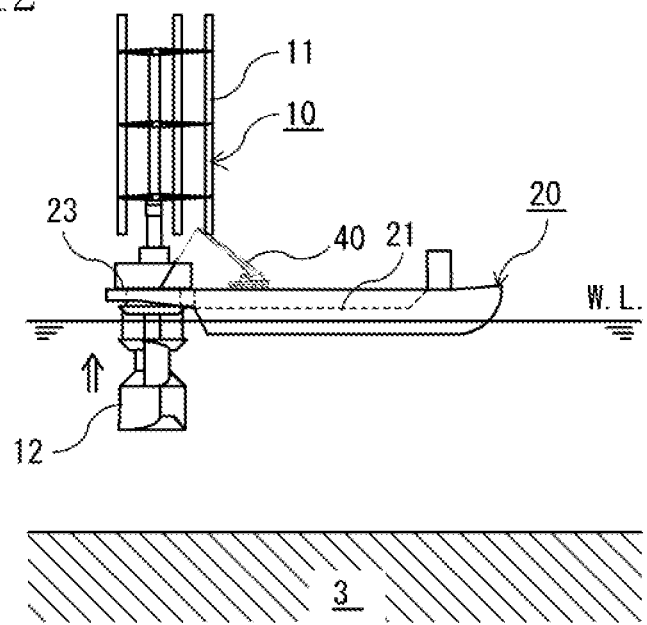
FIG. 12 is a schematic diagram for explaining the method of constructing an offshore structure of the first embodiment according to the present invention, and illustrates a state where the lower structure is raised in a raising step and a state in a joining step.

After the arrangement is completed, when the raising step is performed in the uniting step, the lower structure 12, which is hung by the hanging line 50 or the like such that the part or whole is in the water, is raised to be arranged below the upper structure 11, in the raising step, as illustrated in FIG. 12. The raising of the lower structure 12 can be easily performed by pulling up the hanging line 50 by means of the winch or the crane vehicle 40, or discharging the ballast water in the upper structure 11, or removing ballast, or the like.

According to the method of the raising step, the lower structure 12, the part or whole of which is under the water and which thus requires a relatively small force for vertical movement, is raised in a state where the upper structure 11 is placed on the carrier vessel 20 or is fixed on the sea by the carrier vessel 20 or a towing vessel or the like. This eliminates the necessity of vertically moving the upper structure 10, the most or whole of which is above the water level and which thus requires a large force for vertical movement, and the floating structure 10 can therefore be moored safely at the offshore installation site without using a crane vessel.

Meanwhile, when the lowering step is performed in the uniting step, the upper structure 11 and the lower structure 12 are united by lowering the upper structure 11 by submerging part of the carrier vessel 20 on which the upper structure 11 is mounted while being held by the pair of arm-shaped structures 23, in the lowering step.

In the lowering step, the upper structure 11 is lowered by submerging part of the carrier vessel 20 with the upper structure 11 being placed on the carrier vessel 20 in a state where the lower structure 12 is fixed or moored. Accordingly, the upper structure 11 and the lower structure 12 can be united safely at the offshore installation site without using a crane vessel.

In addition, when the lowering step is configured such that the lower structure 12 is settled on the water bottom 3, a construction method suitable not for the float-type floating structure but for a grounding-type floating structure, which does not require mooring using mooring lines can be achieved. Meanwhile, also in the case of the float-type requiring mooring using mooring lines, under severe weather or oceanographic conditions or tidal currents, the off shore structure 10 can be positioned and held safely at the installation site by temporarily settling and placing the lower structure 12 on the sea bed 3. Note that a tension leg platform (TLP) using tendons as the mooring lines instead of anchor chains, ropes, and the like may be used.

Further, both of the lowering step of lowering the upper structure 11 and the raising step of raising the lower structure 12 may be used in combination. In this case, although both of them may be simultaneously performed, but it is preferable that one of the be performed prior to the other in view of the positioning.

Once the upper side of the lower structure 12 is abutted against or at a distance slightly away from the lower side of the upper structure 11 in the uniting step, the upper side of the lower structure 12 is positioned relative to the lower side of the upper structure 11, and the lower structure 12 is integrated with the upper structure 11 by welding, bolt-fastening, fitting, pinning, and the like, in the joining step.

From the mounting step to the joining step, since the upper structure 11 is consistently in the upright standing state, the work of bringing the upper structure 11 from the laid-down state into the upright standing state on the sea is eliminated, and a crane vessel or a large-sized crane on the carrier vessel 20 becomes unnecessary. Accordingly, instruments and the like installed in the upper structure 11 are not brought into the laid-down state, and these instruments and the like can be provided to the upper structure 11 or inspected on the onshore work. Therefore, the installation work of the instruments and the like on the sea can be omitted to improve the work efficiency. In addition, the upper structure is mounted and fixed on the carrier vessel, and the lower structure is abutted and fixed on the upper structure, such that joining work and the like can be performed in an environment where the entire inertia is large and and pitching and rolling is minimized, and that man-power and motive power required for the joining work and the like can be safely supplied from the carrier vessel.

Then, after the joining step is completed, the integrated upper structure 11 and lower structure 12, that is, the floating structure 10 is unloaded from the carrier vessel 20 and floated on the sea, in the floating step. In the floating step, the stern is submerged by the ballast adjustment of the carrier vessel 20 relative to the floating structure 10 adjusted to be capable of being floated on the water level W.L. to thereby lower the arm-shaped structures 23, so that the offshore structure 10 is floated. Thereafter, the carrier vessel 20 is moved forward to pull the arm-shaped structures 23 away from the offshore structure 10.

In the floating step as well, when the integrated upper structure 11 and lower structure 12 are unloaded from the carrier vessel 20 and floated on the sea, the offshore structure 10 can be unloaded from the carrier vessel 20 by floating the offshore structure 10 by the ballast water operation on the carrier vessel 20 side and pulling the carrier vessel 20 away. Accordingly, a crane vessel or a large-sized crane becomes unnecessary in the floating step as well.

In addition, when the floating step is configured such that part of the carrier vessel 20 is submerged in unloading the integrated upper structure 11 and lower structure 12 from the carrier vessel 20, the integrated upper structure 11 and lower structure 12 can be easily floated on the sea with their attitude maintained in the vertical state. Note that when ballast remains in the lower structure, the floating may be achieved by discharging or removing the ballast.

Next, in the mooring-line connecting step and after the floating step, the integrated upper structure 11 and lower structure 12 and a mooring base 31 are connected by the mooring line 30. In a case where the mooring-line connecting step is provided after the joining step, when a connection portion 32 of the mooring line 30 on the offshore structure 10 side is situated on the lower structure 12 side during the connecting work, the connecting work between the lower structure 12 and the mooring line 30 can be performed not in the water but above the water level W.L., and the joining work can thus be efficiently performed.

On the other hand, in a case where the mooring-line connecting step is provided before the joining step in which the upper structure 11 and the lower structure 12 are integrated, when the connection portion 32 of the mooring line 30 on the offshore structure 10 side is situated on the lower structure 12 side, since the lower structure 12 is connected to the mooring line 30 in a stable state during the joining step, the joining work can be easily performed. Alternatively, when the connection portion 32 is situated on the upper structure 11 side, the joining work can be performed at the stage where the upper structure is mounted and stable on the carrier vessel and the load by the lower structure is not applied to the arm-shaped structures of the carrier vessel.

Next, a method of constructing an offshore structure of a second embodiment will be described. The method of constructing an offshore structure of the second embodiment is different in methods of mounting and carrying a lower structure 12A of an offshore structure 10A from the method of constructing an offshore structure of the first embodiment, but is the same in the other configurations.

Figure 17:
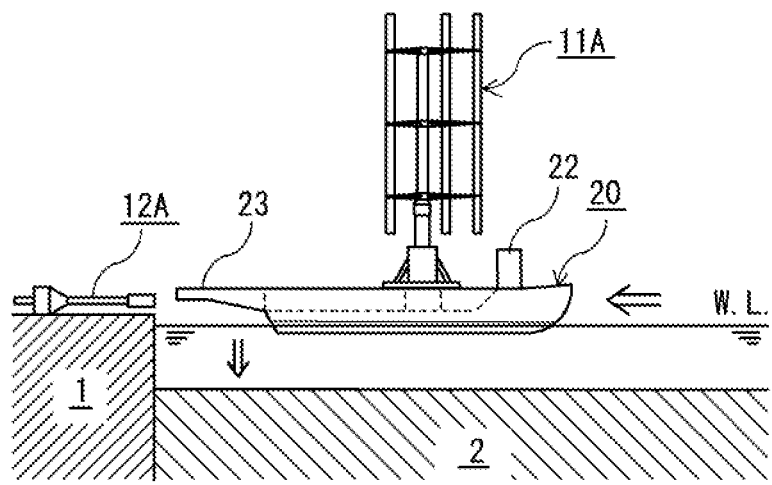
FIG. 17 is a schematic diagram for explaining the method of constructing an offshore structure of the second embodiment according to the present invention, and illustrates a state immediately before mounting a lower structure onto the carrier vessel in the mounting step.
Figure 18:
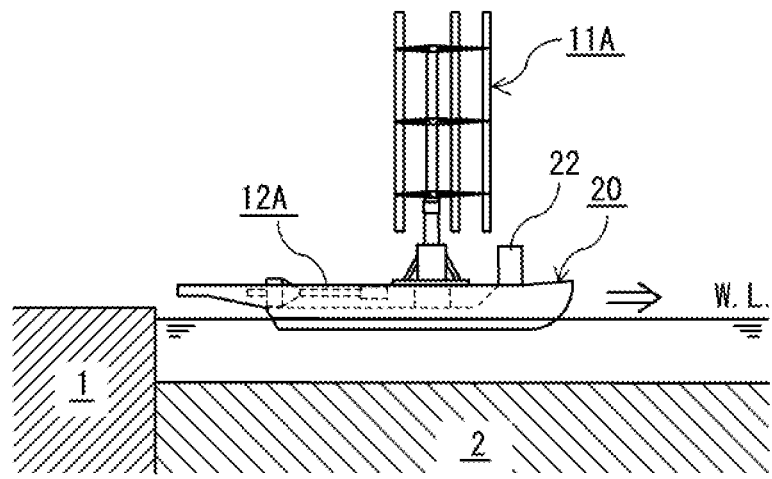
FIG. 18 is a schematic diagram for explaining the method of constructing an offshore structure of the second embodiment according to the present invention, and illustrates a state where the carrier vessel starts operation in a carrying step.
Figure 24:
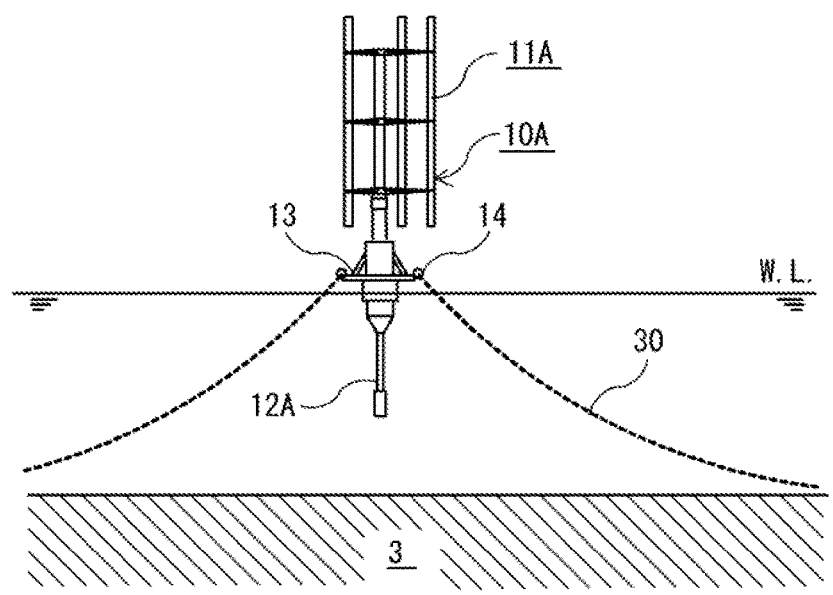
FIG. 24 is a schematic diagram for explaining the method of constructing an offshore structure of the second embodiment according to the present invention, and illustrates a state after construction.

More specifically, the method of constructing an offshore structure of the second embodiment may be employed in mooring the offshore structure 10A of the second embodiment as illustrated in FIG. 24 on the sea, and the mounting and carrying of the upper structure 11A in the manufacturing step and the mounting step are the same as those in the method of constructing an offshore structure of the first embodiment, but the mounting and the carrying of the lower structure 12A in the mounting step and the carrying step are performed in the laid-down state as illustrated in FIGS. 17 and 18.

Figure 19:
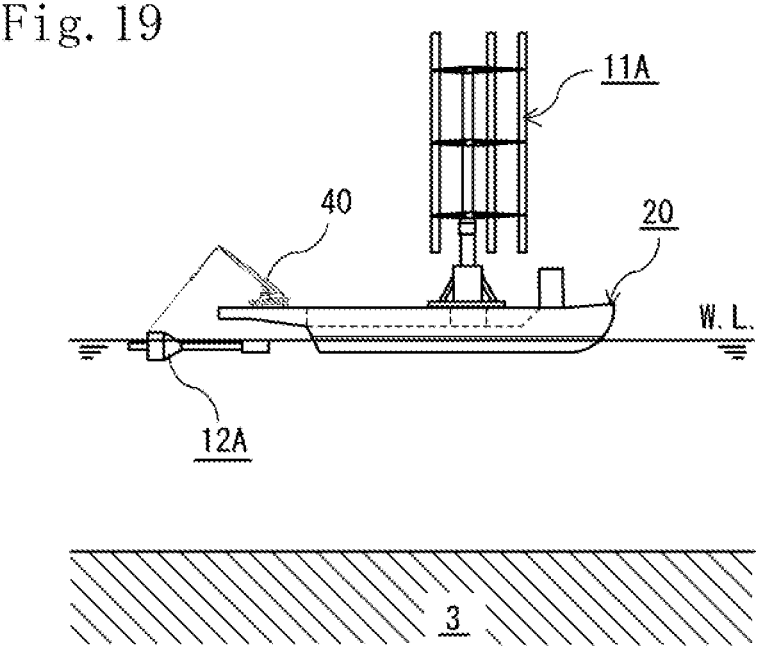
FIG. 19 is a schematic diagram for explaining the method of constructing an offshore structure of the second embodiment according to the present invention, and illustrates a state where the lower structure is launched from the carrier vessel in a launching step.
Figure 20:
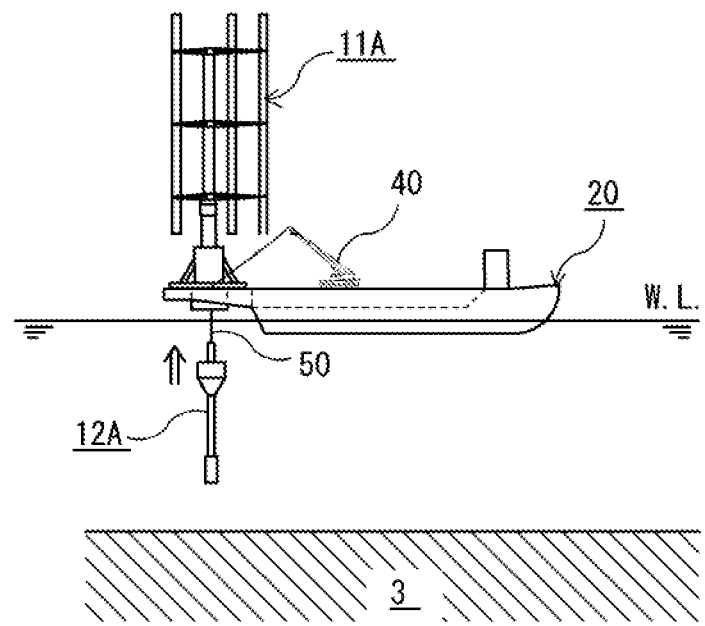
FIG. 20 is a schematic diagram for explaining the method of constructing an offshore structure of the second embodiment according to the present invention, and illustrates a state of the lower structure in an in-water keeping step and a state where the lower structure is moved to the stern on the carrier vessel in a moving step.
Figure 21:
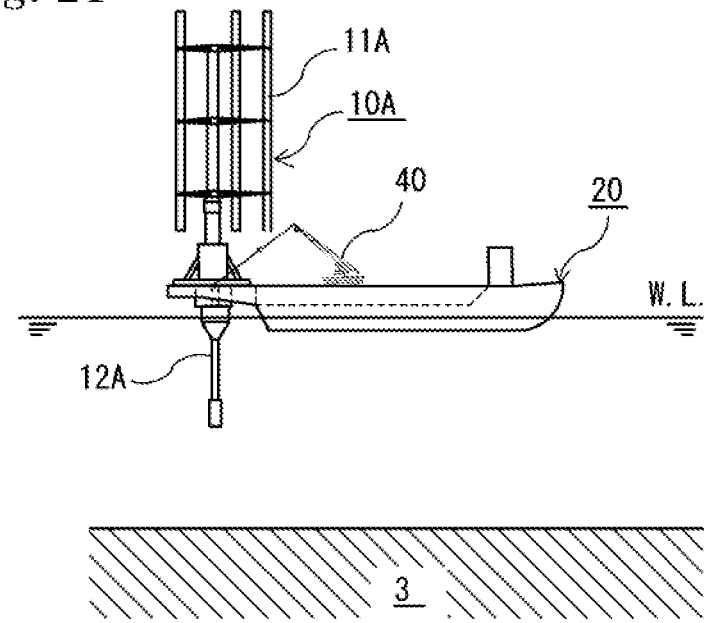
FIG. 21 is a schematic diagram for explaining the method of constructing an offshore structure of the second embodiment according to the present invention, and illustrates a state where the lower structure is raised in a raising step and a state in a joining step.
Figure 22:
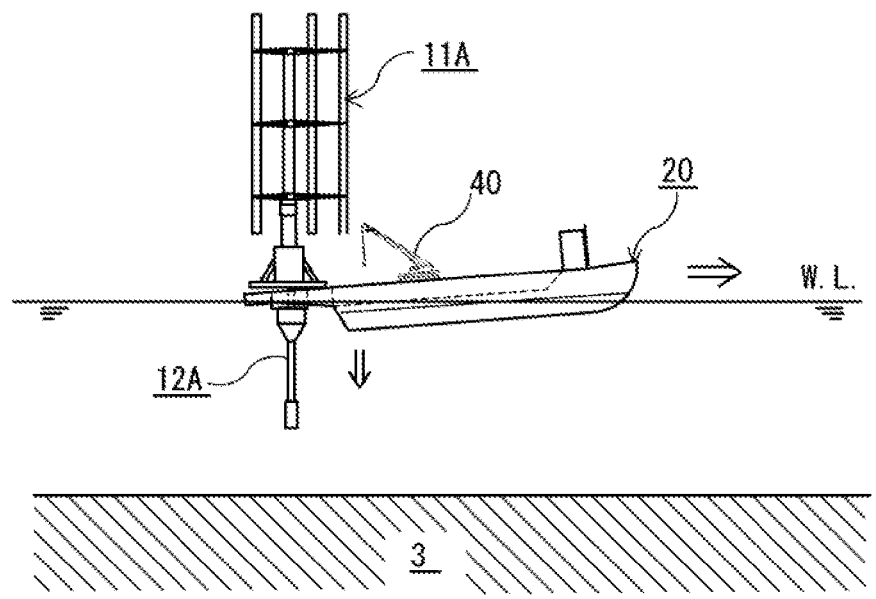
FIG. 22 is a schematic diagram for explaining the method of constructing an offshore structure of the second embodiment according to the present invention, and illustrates a state where an offshore structure is being unloaded from the carrier vessel in a floating step.
Figure 23:
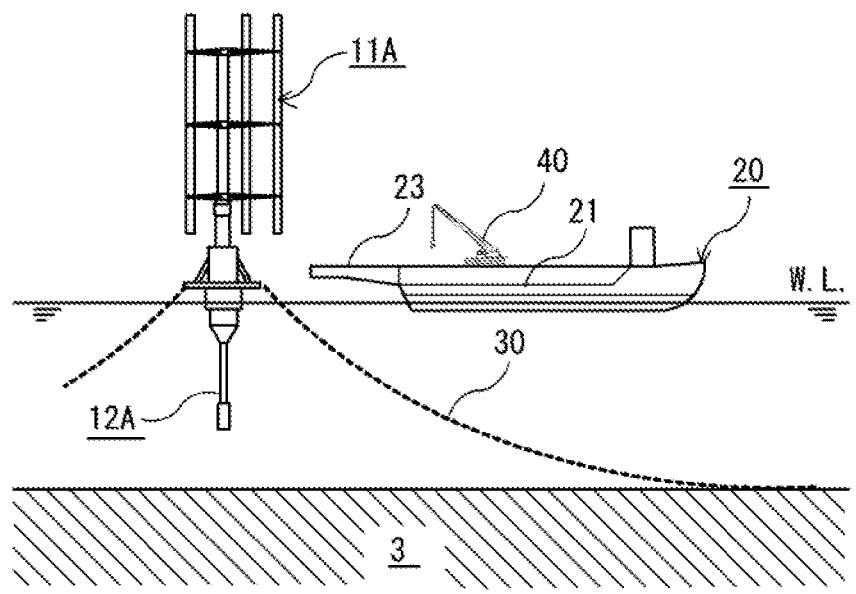
FIG. 23 is a schematic diagram for explaining the method of constructing an offshore structure of the second embodiment according to the present invention, and illustrates a state after a mooring-line connecting step.

For this reason, the launching step requires the work of unloading the lower structure 12A in the laid-down state from the carrier vessel 20 and bringing the lower structure 12A into the vertical state, as illustrated in FIG. 19. This work can be performed in a state where the weight in water of the lower structure 12A is low, requiring no large-sized crane, and can thus be easily performed by hanging the upper portion side of the lower structure 12A by the commercially-available crane vehicle 40 while loading the ballast water or loading ballast to submerge the lower portion side thereof.

The in-water keeping step, the moving step, the joining step, the floating step, and the mooring-line connecting step after bringing the lower structure 12A into the vertical state are the same as those of the method of constructing an offshore structure of the first embodiment, as illustrated in FIGS. 20 to 24.

Therefore, in the methods of constructing an offshore structure and the offshore structures 10, 10A of the first and second embodiments of the present invention, the lower structure 12, 12A, the part or whole of which is in the water, is raised by a hanging line or the like relative to the upper structure 11, 11A, thereby joining the upper structure 11, 11A and the lower structure 12, 12A, on the contrary to the conventional techniques in which when an upper structure 11, 11A and a lower structure 12, 12A are integrated on the sea, relative to the lower structure 12, 12A disposed on the sea, the upper structure hung by a crane or the like is lowered onto the lower structure 12, 12A from above the lower structure 12, 12A, thereby joining the upper structure 11, 11A and the lower structure 12, 12A.

According to these methods of constructing an offshore structure, the lower structure 12, 12A, the part or whole of which is under the water and which thus requires a relatively small force for vertical movement, is raised in a state where the upper structure 11, 11A is placed on the carrier vessel 20 or is fixed on the sea by the carrier vessel 20 or a towing vessel or the like. This eliminates the necessity of vertically moving the upper structure 11, 11A, most or whole of which is above the water level and which thus requires a large force for vertical movement, and the offshore structure 10 can therefore be moored safely at the offshore installation site without using a crane vessel. In addition, the upper structure is mounted and fixed on the carrier vessel, and the lower structure is abutted and fixed on the upper structure; accordingly, joining work and the like can be performed in an environment where the entire inertia is large and pitching and rolling is minimized, and that manpower and motive power required for the joining work and the like can be safely supplied from the carrier vessel.

Note that, since the whole or most of the lower structure 12, 12A is submerged in the water during the installation, even when the lower structure 12, 12A is mounted in the laid-down state onto the carrier vessel 20 or is towed in the laid-down state by a towing vessel, the lower structure 12, 12A can be brought into the vertical state by loading the ballast water or another ballast or the like at the installation site, relatively easily by using only a relatively small crane, a winch, or the like. On the other hand, the upper structure 11, 11A is equipped with instruments, such as a wind power generation facility, which need to be prevented from being submerged in the water. For this reason, when the upper structure 11, 11A is carried in the laid-down state as in the conventional techniques, it is necessary to bring the upper structure 11, 11A from the laid-down state into the vertical state on the sea at the installation site or on the carrier vessel 20, which requires a crane vessel or a large-sized crane on the carrier vessel.

According to the floating structure 10, 10A of the above-described configuration, the upper structure 11, 11A of the floating structure 10, 10A can be mounted in the upright standing state on the carrier vessel 20 including the ballast tank and the pair of arm-shaped structures 23 protruding from an end portion, which is the bow or the stern, of the hull of the carrier vessel in the bow-stern direction. Therefore, the above-described method of constructing an offshore structure can be implemented and the same operations and effects as those of the above-described method of constructing a floating structure can be obtained.

Next, the configurations of offshore structures 10, 10A, 10B, 10C will be described with reference to FIGS. 15, and 24 to 27. Each of these offshore structures 10, 10A, 10B, 10C has a structure with the center of buoyancy located above the center of gravity, and the upper structure 11, 11A, 11B, 11C of each is mainly constituted of an on-water portion and the lower structure 12, 12A, 12B, 12C thereof is mainly constituted of a submerging portion. The upper structure 11, 11A, 11B, 11C and the lower structure 12, 12A, 12B, 12C are connected to each other in such a manner as to be capable of being coupled and separated. Note that the term "mainly" refers to 70% or more, or preferably 80% or more, for example.

The configuration capable of coupling facilitates the installation of the offshore structure 10, 10A, 10B, 10C and the configuration capable of separating facilitates the removal work of the offshore structure 10, 10A, 10B, 10C. Accordingly, the floating structure 10, 10A, 10B, 10C can be easily moved or dismantled. In addition, in a case where the mooring is connected to the lower structure, when serious failure occurs in the upper structure and a similar event occurs, it is possible to easily remove and bring back only the upper structure and then to easily reinstall the upper structure after restoration.

Moreover, while the upper structure 11, 11A, 11B, 11C is at least almost assembled in the upright standing state onshore and carried in the upright standing state, the lower structure 12, 12A, 12B, 12C is configured to have such a mechanism that the lower structure 12, 12A, 12B, 12C is carried to she offshore installation site of the offshore structure 10, 10A, 10B, 10C or a sea area with a sufficient water depth, and then brought into the upright standing state.

When the offshore structure 10, 10A, 10B, 10C is moored, it is preferable that a connection portion 14 of the mooring line 30 on the offshore structure 10, 10A, 10B, 10C side be provided to the upper structure 11, 11A, 11B, 11C, making it possible to perform the works and inspections on the connection portion 14 on the water, or preferably near the water level W.L.

In addition, in these offshore structures 10, 10A, 10B, 10C, it is preferable that the lower structure 12, 12A, 12B, 12C be formed to have a ballast-water loading and discharging facility (not illustrated) for not only loading but also discharging ballast water or to have a ballast loading and discharging facility (not illustrated) for not only loading but also discharging solid ballast, or to have a structure with which the ballast-water loading and discharging facility or the ballast loading and discharging facility is capable of being temporarily attached thereto. In short, it is preferable that these lower structures 12, 12A, 12B, 12C have a facility for loading and discharging the ballast water, or have a facility for loading and discharging the solid ballast, or have a structure capable of being equipped with such facilities.

As a method of discharging the ballast water, it is possible to use a pump, an air lift, or extrusion by injection of compressed air. In addition, as a method of discharging the solid ballast, when a powder, a powdery solid, or a slurry is used, it is possible to use a slurry pump, an ejector, or an air lift for removal of these. Note that a heavy solid or slurry also can be easily discharged by using an air-lift system which uses uplifting force of a gas by mixing the gas in a liquid to uplift a solid mixed in a liquid inside an air-lift pipe by using the mixed gas of the liquid and the gas.

In this way, the lower structure 12, 12A, 12B, 12C can be easily uplifted, so that the work of coupling the upper structure 11, 11A, 11B, 11C and the lower structure 12, 12A, 12B, 12C on the sea can be easily performed, and further, when the offshore structure 10, 10A, 10B, 10C is removed from the offshore installation site, the offshore structure 10 can be easily disassembled and removed in the reverse procedure to that of the installation by discharging the ballast (by deballasting). This makes it possible to resolve the difficulties in moving and dismantling the offshore structure 10, 10A, 10B, 10C.

Note that in the case of a normal spar-type offshore structure of the conventional techniques, since ballasting work is performed by cramming an undischargeable solid ballast such as heavy concrete or iron ore which is bound and integrated with proceeding of oxidation, the offshore structure is difficult to remove even at an installation site with a shallow water depth, and thus cannot be moved. Moreover, even if the offshore structure cannot be moved to an area with a shallow water depth because of its large draft, it brings about the problem of environmental pollution to sink and discard the offshore structure that has become unnecessary in a high sea with a deep water depth. Configuring the offshore structures 10, 10A, 10B, 10C as being deballastable to be easily movable as in the present invention becomes a great advantage in terms the measures against the environmental pollution.

In addition, as illustrated in FIG. 24, in the offshore structure 10A, the engagement portion 11ba, which is configured such that when the upper structure 11A is mounted in the upright standing state onto the carrier vessel 20, the engagement portion 11ba receives the pair of arm-shaped structures 23 provided in the carrier vessel 20 and places the upper structure 11A onto the pair of arm-shaped structures 23, is formed of a protruding part 13 protruding from the upper structure 10A horizontally in three directions or more. Moreover, the protruding part 13 is provided with a connection portion 14 for connecting the mooring line 30. Furthermore, it is preferable that the protruding part 13 be configured to be capable of being used for safety during assembly work in the upright standing state onshore.

In short, it is preferable that the protruding part 13 protruding in three directions or more be provided on the upper structure 11A and the protruding part 13 be provided with the connection portion 14 for the mooring line 30 at a position above water during the mooring work. This makes it possible to perform, at the protruding part 13, the mounting work for the upper structure 11A onto the carrier vessel 20, as well as the connecting work, the adjusting work, and the inspection work for the mooring line 30 at the connection portion 14. In particular, when the protruding part 13 is above water during the mooring work, diving work becomes unnecessary, so that the connecting work of these mooring lines 30 and the like can be easily performed. Meanwhile, when the protruding part 13 is below but near the water level W.L. during the mooring work, the connecting work of the mooring lines 30 and the like becomes relatively easy.

Figure 25:
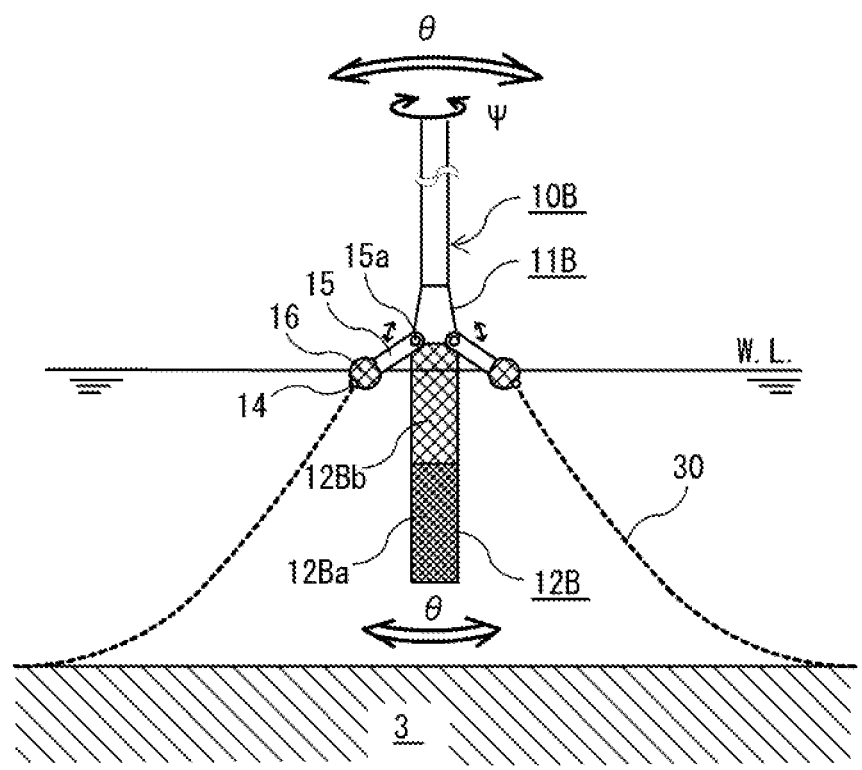
FIG. 25 is a schematic diagram illustrating a state after mooring of the offshore structure of an embodiment according to the present invention.

In addition, the offshore structure 10B illustrated in FIG. 25 is a vertically long structure including an upper structure 11B and a lower structure 12B, and is configured such that the lower structure 12B includes a weight 12Ba in a lower portion thereof and a buoyancy body 12Bb above the weight 12Ba. On the other hand, the floating structure 100 illustrated in FIG. 27 includes an upper structure 11C and a lower structure 12C, and is configured such that the lower structure 12C includes a weight 12Ca in a lower portion thereof and a buoyancy body 12Cb above the weight 12Ca. However, the weight 12Ca is a water wheel also serving as a weight, and is wider in width than the lower structure 12B of the vertically long offshore structure 10B. Moreover, the upper structure 11C includes a vertical-axis wind wheel.

Figure 26:
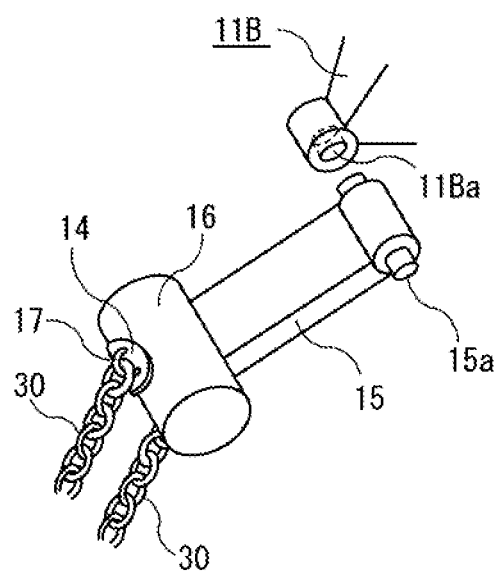
FIG. 26 is a schematic diagram illustrating a configuration of an arm.
Figure 27:
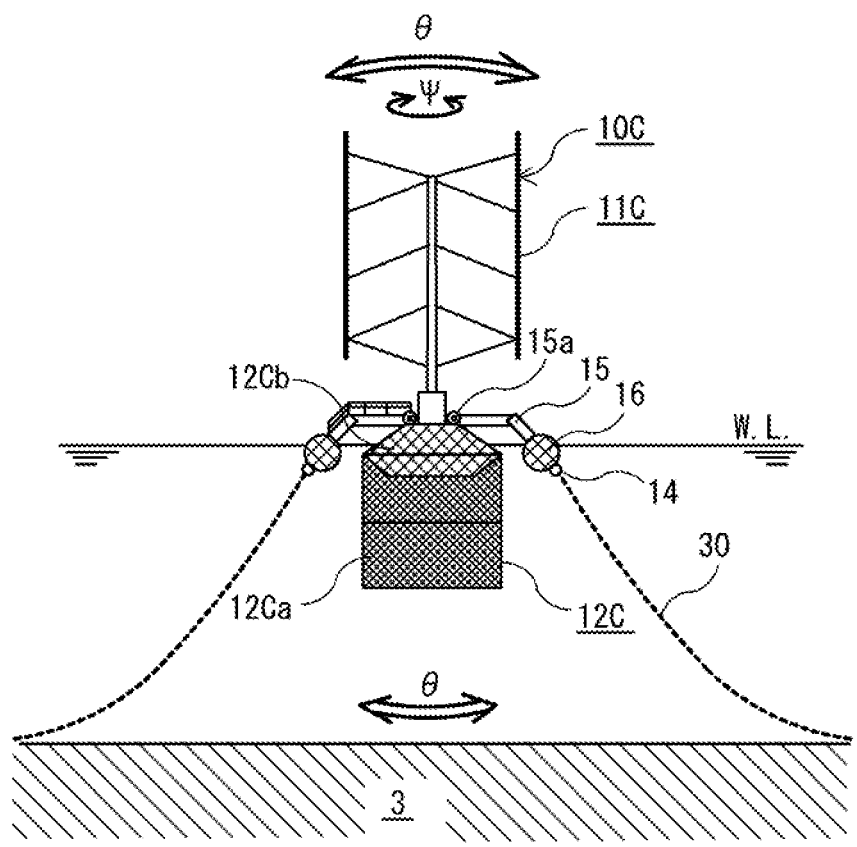
FIG. 27 is a schematic diagram illustrating a state after mooring of the offshore structure of another embodiment according to the present invention.

Then, as illustrated in FIGS. 25 to 27, in the offshore structure 10B, 10C, the offshore structure 10B, 10C is moored by the mooring lines 30 and the offshore structure 10B, 10C is provided with an arm 15. One end side of the arm 15 is swingable only about the horizontal axis, and a rotary shaft 15a of the arm 15 is inserted in an insertion hole 11Ba of the offshore structure 10B, 10C (the upper structure 11B of the offshore structure 10B in FIG. 26) and is rotatably fixed. In addition, the connection portion 14 for connecting the mooring line 30 is provided on the other end side of the arm 15. Note that the arm 15 may be provided on the upper structure 11B, 11C side of the offshore structure 10B, 10C or may be provided on the lower structure 12B, 12C side.

This makes it possible to solve the problem in the mooring of the conventional technique for the spar-type offshore structure 10X, in which since a connection member 17, such as a chain stopper, is provided at a position at a small distance (attachment radius) from a center axis of the offshore structure 10X in the vertical direction, the restoring moment by the mooring force of the mooring line 30, which acts on a swing (hereinafter referred to as twist) ψ of the floating structure 10X in the turning direction, that is, on the horizontal plane, and which is in the direction to return the twist ψ. The twist ψ occurs in direct relation to the power generating torque when the offshore structure 10X is equipped with a vertical-axis wind wheel, and occurs in direct relation to the turning or maintaining of a horizontal-axis wind wheel to windward against wind force when the offshore structure 10X is equipped with a horizontal-axis wind wheel.

Against this, in the offshore structures 10B, 10C illustrated in FIGS. 25 to 27, the arm 15 is interposed, so that the connection portion 14 can be provided at a position at a large distance (attachment radius) from the center axis of the offshore structure 10B, 10C in the vertical direction by an amount corresponding to the arm 15. Accordingly, the restoring moment by the mooring force of the mooring line 30, which acts in the direction to return the twist ψ can be increased, making it possible to suppress the swing (turning motion) in which the entire offshore structure 10B, 10C is twisted and returned in the turning direction.

Figure 28:
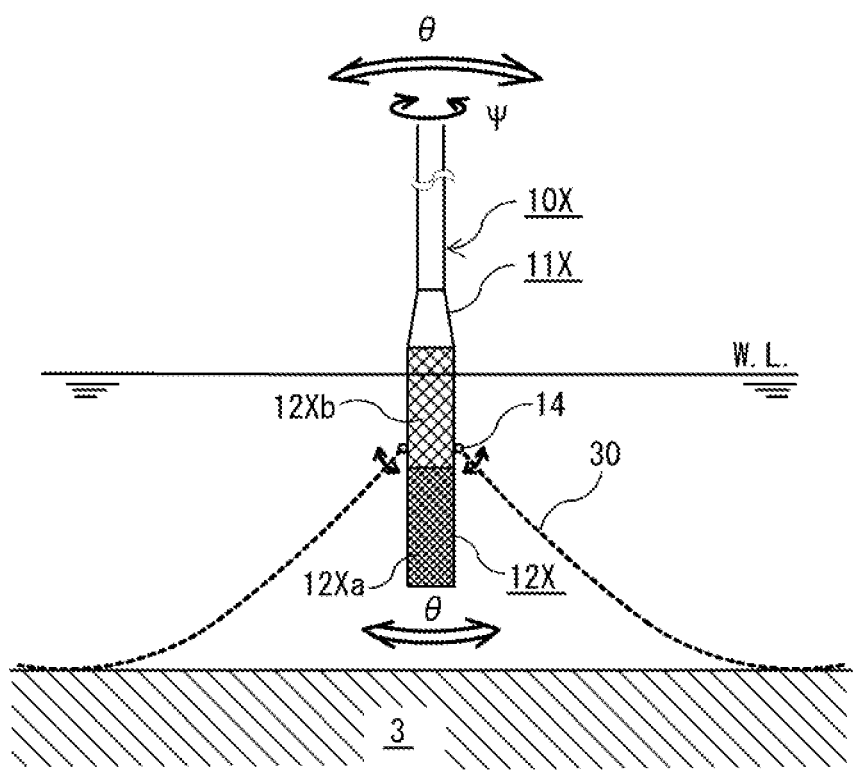
FIG. 28 is a schematic diagram illustrating a state after mooring of an offshore structure of a conventional technique.

Moreover, when the connection portion 14 is provided at a position with a small attachment radius as in the offshore structure 10X of the conventional technique illustrated in FIG. 28, with the swing (inclination) θ of the offshore structure 10X about the horizontal axis, the amount of displacement at the position of the connection portion 14 due to the swing becomes small. Accordingly, the variation in mooring force of the mooring line 30 becomes small, and the allowable range for the swing θ of the offshore structure 10X about the horizontal axis is wide.

On the other hand, as illustrated in FIGS. 25 and 27, when the connection portion 14 is provided at a position with a large attachment radius, with the inclination (swing about the horizontal axis) θ of the offshore structure 10B, 10C, the amount of displacement at the position of the connection portion 14 due to the inclination θ becomes large. Accordingly, the variation in mooring force of the mooring line 30 also becomes large, and the allowable range for the swing θ of the offshore structure 10B, 10C about the horizontal axis becomes narrow. However, against this, in the offshore structure 10B, 10C, as illustrated in FIGS. 25 to 27, the arm 15 is supported at one end side on the offshore structure 10B, 10C (the upper structure 11B, 11C in the drawings) in such a manner as to be swingable only about the horizontal axis, that is, inclinable. This makes it possible to reduce the variation in mooring force of the mooring line 30 and to thus widen the allowable range for the swing θ of the offshore structure 10B, 10C.

Furthermore, a swinging part (not illustrated) swingable about the vertical axis is provided on the other end side of the arm 15, and the connection portion 14 for connecting the mooring line 30 is provided on the swinging part. The swinging part can be easily formed of a member swingable about the vertical axis, for example, a member having a rotary shaft in the vertical direction and provided to be rotatable about the rotary shaft, or the like. In this way, as the attachment radius of the connection portion 14 is increased by providing the arm 15, the variation in the mooring direction of the mooring line 30 at the connection portion 14 due to the twist (swing in the turning direction) ψ of the offshore structure 10B, 10C increases; however, this swinging part swingable about the vertical axis allows for the increase in the variation in the mooring direction of the mooring line 30, thus making it possible to prevent the connection portion 14 and the mooring line 30 from damaging.

Moreover, when an intermediate buoy (intermediate float) 16 is provided on the other end side of the arm 15, the vertical movement of the offshore structure 10B, 10C can be absorbed by the swinging of the arm 15 about the horizontal axis. Accordingly, it is possible to significantly reduce the movement of the connection portion 14 provided on the intermediate buoy 16 and the movement of the mooring line 30 connected to the connection portion 14 relative to the vertical movement of the offshore structure 10B, 10C.

In addition, since the vertical component of the mooring force, which varies depending on the water depth and the like, can be absorbed by the change in buoyancy due to the floating and sinking of this intermediate buoy 16, the buoyancy required for the buoyancy body 10Bb, 10Cb of the offshore structure 10B, 10C can be standardized irrespective of the water depth at the installation site and the like.

The offshore structure 100 includes the mooring arm 15 which is supported on the offshore structure 10C while having a hinge (the rotary shaft swingable about the horizontal axis) 15a vertically rotatable on the base side and which includes a fixation portion (the connection portion) 14 for the mooing line 30 at the tip end side. The offshore structure 10C is a float-mooring system to be moored by utilizing this mooring arm 15.

In addition, in the configuration of the offshore structure 10C, a plurality of the mooring lines 30 may be connected to the tip end side of the mooring arm 15, and a buoyancy portion (the intermediate buoy 16) or a weight portion may be provided on the tip end side of the mooring arm 15. Furthermore, the offshore structure 100 itself also has the buoyancy body 12Cb configured to generate buoyancy and has the weight 12Ca in the water for maintaining the offshore structure 10C in the vertical posture during the mooring. Moreover, the weight 12Cb is a water wheel and a wind wheel is provided on the buoyancy body 12Cb.

In this way, it is possible to reduce the restoring force due to the mooring force with respect to the inclination θ of the offshore structure 10C because of the small attachment radius of the pivot (the rotary shaft of the arm 15) 15a, which allows only the vertical rotation (inclination) θ; on the other hand, since the attachment radius of the connection portion 14 to attach the connection member 17 such as a chain stopper is large, the restoring force due to the mooring force against the twist (turn) ψ is large, in other words, the rigidity of the mooring against the twist (turn) ψ is high.

In addition, there is a characteristic that since the intermediate buoy 16 acts against the downward force of the mooring, the buoyancy necessary for the buoyancy body 12Cb of the offshore structure 10C can be standardized irrespective of the water depth and the like.

In addition, the buoyancy body 12Cb of the offshore structure 10C may be turned together with the water wheel 12Ca. In this case, the portion occupied by the buoyancy body 12Cb and the water wheel 12ba can be significantly simplified, and the diameter of the water wheel 12Ca can be increased. In addition, a rubber bearing which supports detachably or turnably by means of a rubber member but has poor durability, can be eliminated. In addition, a large allowable singing angle can be taken than the case of the rubber bearing. Moreover, in a case where the buoyancy body 12Cb does not turn together with the water wheel 12Ca, even when the limit angle is reached, since the water wheel 12Ca as well as the arm 15 and the intermediate buoy 16, which do not rotate together, come into contact with each other, this can be structurally easily handled.

INDUSTRIAL APPLICABILITY

According to the method of constructing an offshore structure and the offshore structure of the present invention, an offshore structure can be moored safely at an offshore installation site without using a crane vessel in a method of constructing an offshore structure such a spar type with a wind turbine or the like mounted thereon. Therefore, the method of constructing an offshore structure and the offshore structure of the present invention can be utilized widely for a variety of offshore structures and construction methods thereof.

EXPLANATION OF REFERENCE NUMERALS 10, 10A, 10B, 10C, 10X offshore structure
11, 11A, 11B, 11C, 11X upper structure
12, 12A, 12B, 12C, 12X lower structure
12Ba, 12Ca, 12Xa weight
12Bb, 12Cb, 12Xb buoyancy body
12 protruding part
14 connection portion
15 arm
15a rotary shaft
16 intermediate buoy
20 carrier vessel
21 deck
22 bridge
23 arm-shaped structure
30 mooring line
31 mooring base
32 connection portion of the mooring line
40 crane vehicle
50 hanging line

The invention claimed is:

1. A method for constructing an offshore structure, comprising:
   a manufacturing step of manufacturing an offshore structure separated in an upper structure and a lower structure;
   an in-water keeping step of keeping part or whole of the lower structure in an upright standing state in water;
   a moving step of moving the upper structure to above the lower structure kept in the upright standing state;
   a uniting step of performing a raising step of raising the lower structure to arrange the lower structure on a lower side of the upper structure which is held by a pair of arm-shaped structures provided to a carrier vessel that carries the upper structure; and
   a joining step of integrating the lower structure with the upper structure.

2. The method of constructing an offshore structure according to claim 1, wherein in the raising step, the lower structure is raised by using a winch mounted on the carrier vessel.

3. The method of constructing an offshore structure according to claim 1,
   wherein the joining step is a step of integrating the lower structure with the upper structure in a state where the upper structure is held by the pair of arm-shaped structures of the carrier vessel,
   wherein the method further comprises, between the manufacturing step and the in-water keeping step:
     a mounting step of mounting the upper structure in the upright standing state on the carrier vessel including a ballast tank and the pair of arm-shaped structures protruding from an end portion of a hull of the carrier vessel in a bow-stern direction, the end portion being a bow or a stern;
     a carrying step of carrying the upper structure and the lower structure one by one or simultaneously to an offshore installation site by means of the carrier vessel; and
     a launching step of hanging the lower structure down from the carrier vessel by means of a hanging line and lowering the lower structure into the water, and
   wherein the method further comprises, after the joining step:
     a floating step of unloading the integrated upper structure and lower structure from the carrier vessel and floating the integrated upper structure and lower structure on the sea.

4. The method of constructing an offshore structure according to claim 3, wherein in the floating step, when the integrated upper structure and lower structure are unloaded from the carrier vessel, part of the carrier vessel is submerged.

5. The method of constructing an offshore structure according to claim 3, wherein in the launching step, the lower structure is settled on the sea bed.

6. The method of constructing an offshore structure according to claim 3,
   wherein the method further comprises, after the carrying step and before the joining step:
     a mooring-line connecting step of connecting the upper structure or the lower structure to a mooring base with a mooring line.

7. The method of constructing an offshore structure according to claim 3,
   wherein the method further comprises, after the joining step:

a mooring-line connecting step of connecting the integrated upper structure or lower structure to a mooring base with a mooring line.

8. A method for constructing an offshore structure, comprising:
- a carrying step of carrying an upper structure and a lower structure on separate carrier vessels or on a common carrier vessel, to an offshore installation site;
- an in-water keeping step of keeping part or whole of the lower structure in an upright standing state in water;
- a moving step of moving the upper structure to above the lower structure kept in the upright standing state;
- a uniting step of performing a raising step of raising the lower structure to arrange the lower structure on a lower side of the upper structure which is held by a pair of arm-shaped structures provided to one of the separate carrier vessels or the common carrier vessel that carries the upper structure; and
- a joining step of integrating the lower structure with the upper structure.

* * * * *